United States Patent
Matsumoto et al.

(10) Patent No.: US 12,473,998 B2
(45) Date of Patent: Nov. 18, 2025

(54) HOLDER FOR LONG MEMBER

(71) Applicant: PIOLAX, INC., Kanagawa (JP)

(72) Inventors: Tomoyuki Matsumoto, Kanagawa (JP); Masatoshi Inoue, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 26 days.

(21) Appl. No.: 18/498,762

(22) Filed: Oct. 31, 2023

(65) Prior Publication Data

US 2024/0151327 A1    May 9, 2024

(30) Foreign Application Priority Data

Nov. 4, 2022  (JP) .................................. 2022-177310

(51) Int. Cl.
*F16L 3/223*    (2006.01)
*F16L 3/10*    (2006.01)
*F16L 3/13*    (2006.01)

(52) U.S. Cl.
CPC ........... *F16L 3/2235* (2013.01); *F16L 3/1058* (2013.01); *F16L 3/13* (2013.01)

(58) Field of Classification Search
CPC ......... F16L 3/2235; F16L 3/1058; F16L 3/13; F16L 3/22; H02G 3/26; B60R 16/0215
USPC ...................................................... 248/67.5
See application file for complete search history.

(56) References Cited

U.S. PATENT DOCUMENTS

2003/0136884 A1 *  7/2003  Miura ..................... F16B 37/00
                                                           248/68.1

FOREIGN PATENT DOCUMENTS

JP           2021-092300 A      6/2021
WO    WO-2020250683 A1 *  12/2020  .............. F16L 3/223

* cited by examiner

*Primary Examiner* — Christopher Garft
(74) *Attorney, Agent, or Firm* — Paratus Law Group, PLLC

(57) ABSTRACT

A holder for a long member includes: a holding member that includes a frame-shaped body portion; an anti-vibration member that includes a frame-shaped portion; and a fixing member that is provided with an insertion portion, and a flange. The anti-vibration member includes a pair of extension pieces that protrude in a state where the frame-shaped portion is inserted into the frame-shaped body portion, and that are sandwiched between the frame-shaped body portion and the flange when the insertion portion is inserted into the frame-shaped portion. Clearance is provided between an inner surface of a frame-shaped body portion side wall that faces a first wall in which the pair of extension pieces of the anti-vibration member are not provided in the frame-shaped body portion, and an outer edge of the flange facing the frame-shaped body portion side wall.

6 Claims, 18 Drawing Sheets

HOLDER FOR LONG MEMBER

CROSS-REFERENCE TO RELATED APPLICATIONS

This application is based on Japanese Patent Application No. 2022-177310 filed on Nov. 4, 2022, the contents of which are incorporated herein by way of reference.

TECHNICAL FIELD

The present invention relates to a holder for a long member that holds a long member with a line shape, a tubular shape, or a rod shape.

BACKGROUND

For example, pipes, tubes, wires, cables, harnesses, and the like are used in automobiles, but are entangled, interfere with other members, or are damaged in some cases. Therefore, such things are usually housed and held in some holders and are often arranged at predetermined positions inside vehicles via the holders.

For example, the following Patent Literature 1 discloses a holder that is fixed to a fixed member including a protruding fixed portion via the fixed portion and holds a long member.

The holder for the long member includes a holding member that includes a holding portion holding a long member and a frame-shaped body portion to which the holding portion is connected, an anti-vibration member that includes a frame-shaped portion inserted into the frame-shaped body portion and a pedestal coming into contact with the fixed member, and the fixing member that includes an insertion portion inserted into the frame-shaped portion and receiving the fixed portion, and is fixed to the fixed portion.

The fixing member includes a flange at the other end. In the anti-vibration member, an extension piece extends from a side opposite to the pedestal side of the frame-shaped portion. The extension piece is pressed by the flange and can be curved outwards. Further, as illustrated in FIG. 10 of Patent Literature 1, the extension piece is sandwiched between the flange and an upper end surface of the frame-shaped body portion.

[Patent Literature 1] JP2021-92300A

Incidentally, when the long member is held by the holder as in the above Patent Literature 1, the long member is generally held to be substantially parallel or at a predetermined angle with respect to a fixed surface of the fixed member.

However, when a force that twists the long member, that is, a force that causes the long member to approach or move away from the fixed surface of the fixed member is applied, the flange of the fixing member and the upper end surface of the frame-shaped body portion may come into contact with each other and interfere with each other in some cases. Then, for example, vibration or the like occurring from the long member may be transmitted to the fixing member via the frame-shaped body portion, and thus anti-vibration performance of the anti-vibration member cannot be sufficiently achieved because the anti-vibration member is not involved.

Accordingly, an object of the present invention is to provide a holder for a long member that hinders the holding member and the fixing member from interfering with each other to sufficiently achieve anti-vibration performance of the anti-vibration member even when a force that twists the long member is applied.

SUMMARY

A holder for a long member is configured to be fixed to a fixed member including a shaft member via the shaft member and is configured to hold the long member. The holder for the long member includes: a holding member that includes a frame-shaped body portion to which a holding portion for holding the long member is connected; an anti-vibration member that is made of an elastic material and includes a frame-shaped portion configured to be inserted into the frame-shaped body portion; and a fixing member that is provided with an insertion portion configured to be inserted into the frame-shaped portion and configured to receive the shaft member, a locking portion provided inside the insertion portion and configured to be locked to the shaft member, and a flange overhung on one end side of the insertion portion. The anti-vibration member includes a pair of extension pieces that protrude from the frame-shaped body portion in a state where the frame-shaped portion is inserted into the frame-shaped body portion, and that are sandwiched between the frame-shaped body portion and the flange when the insertion portion is inserted into the frame-shaped portion. When viewed in an insertion direction of the insertion portion, clearance is provided between an inner surface of a frame-shaped body portion side wall that faces a first wall in which the pair of extension pieces of the anti-vibration member are not provided in the frame-shaped body portion, and an outer edge of the flange facing the frame-shaped body portion side wall.

DESCRIPTION OF EMBODIMENTS (Embodiment of Holder for Long Member)

Hereinafter, an embodiment of a holder for a long member according to the present invention will be described with reference to the drawings.

Figure 14:
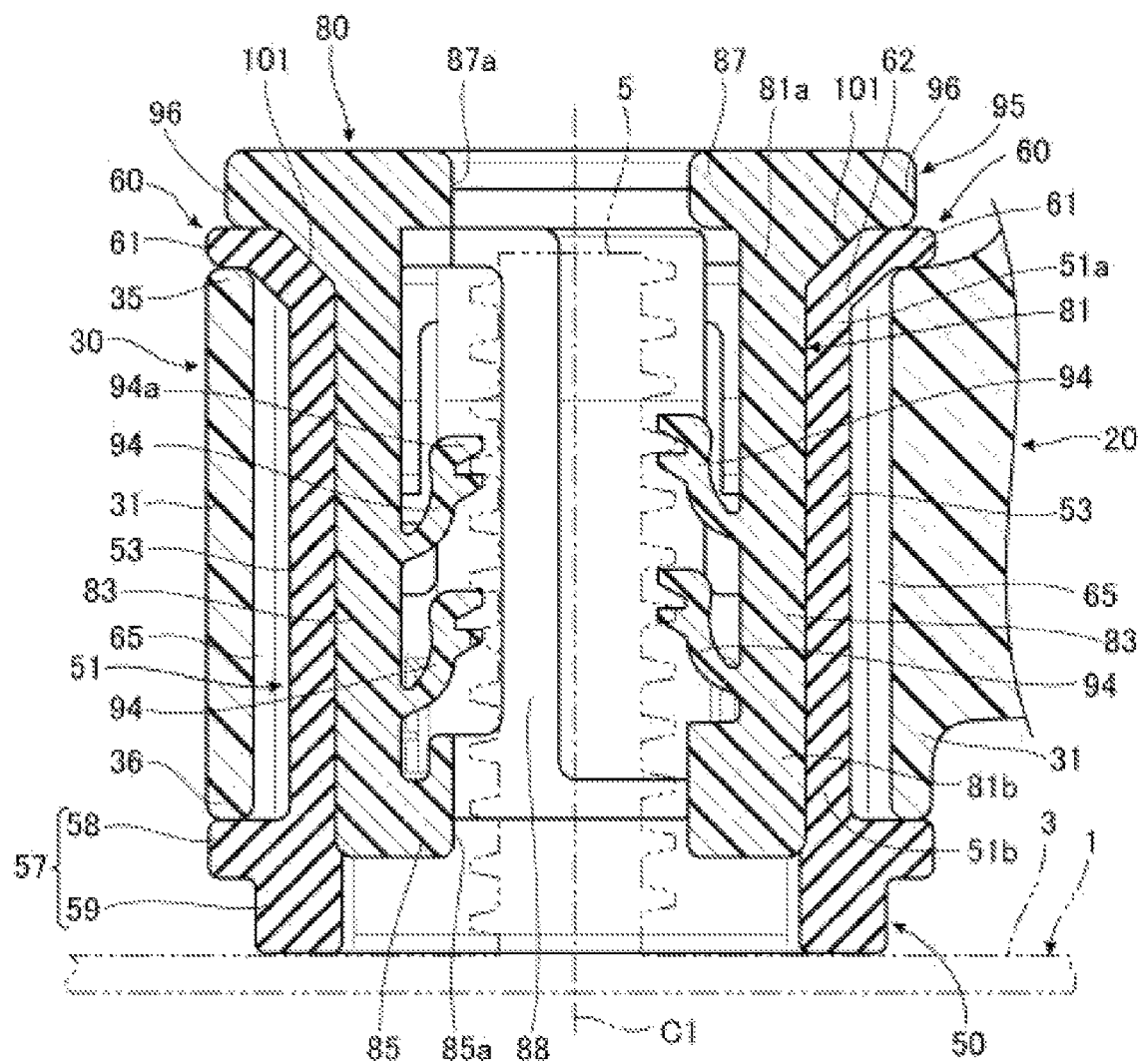
FIG. 14 is a sectional view taken along arrow line A-A of FIG. 2.

As illustrated in FIG. 14, a holder 10 for a long member in the embodiment (hereinafter simply referred to as the "holder 10") is fixed to a fixed member 1 including a shaft member 5 via the shaft member 5 and holds the long member P (see FIG. 12).

As illustrated in FIG. 14, in the embodiment, the shaft member 5 protrudes from a fixed surface 3 (meaning one-side portion of the fixed member 1 in a thickness direction and a surface on which the holder is disposed) of the fixed member 1 such as a vehicle body panel or a vehicle body frame.

Examples of the shaft member 5 include a so-called stud bolt that is erected integrally or separately from the fixed surface 3 and has an external circumferential surface with a screw groove. An axial direction (meaning a direction along an axial center C1 of the shaft member 5 illustrated in FIG. 14) of the shaft member 5 in the embodiment is orthogonal to a planar direction of the fixed surface 3. The shaft member 5 is not limited to the stud bolt, and may be, for example, a columnar member with a prismatic shape or a cylindrical shape or may engage with a fixing portion (which will be described below) of a fixing member 80.

The long member P is, for example, a member with a line shape, a tubular shape, or a rod shape, such as a pipe, a tube, a hose, a rod, a wire, a cable, a harness, or a cord.

Figure 1:
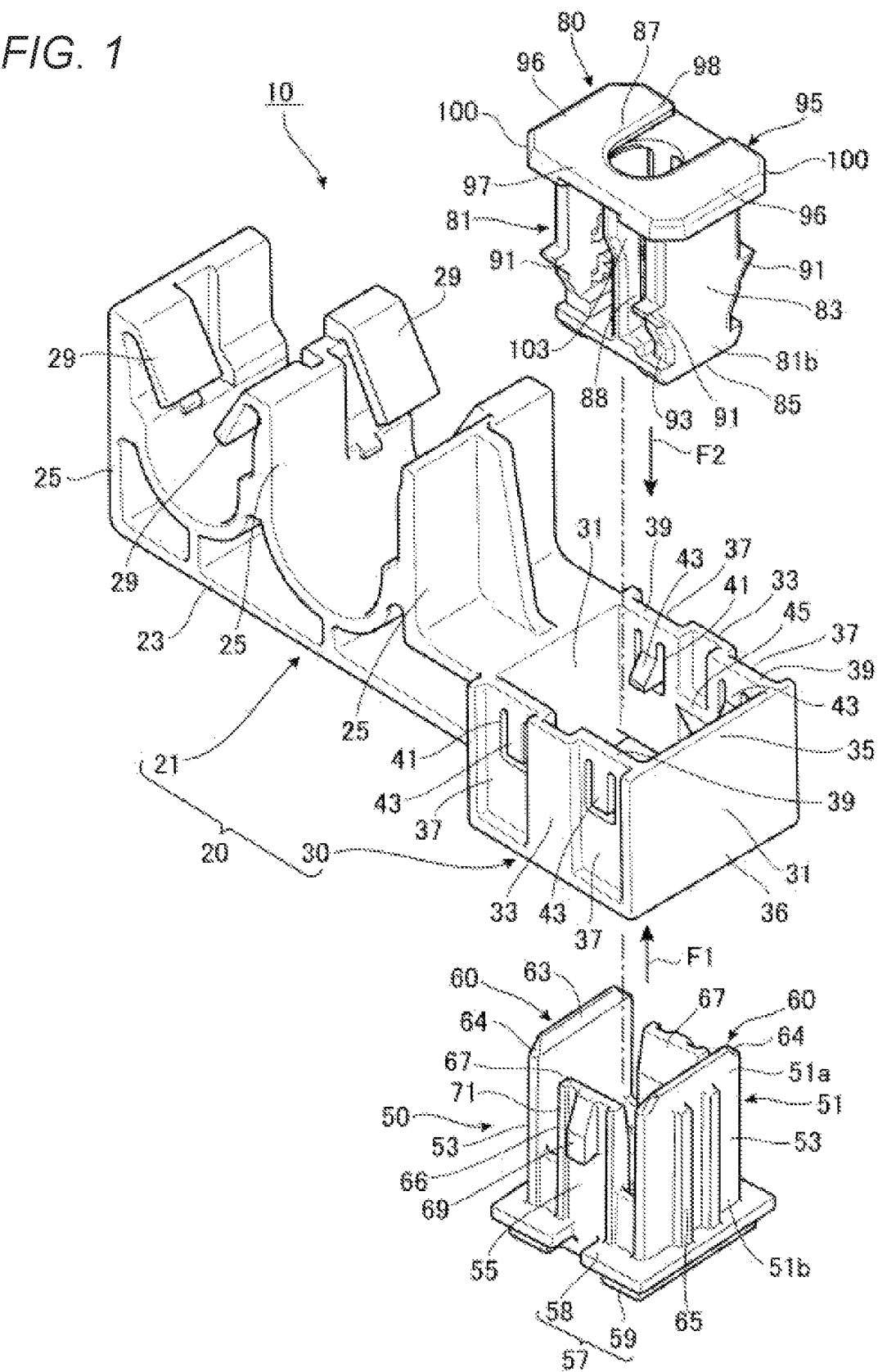
FIG. 1 is an exploded perspective view illustrating an embodiment of a holder for a long member according to the present invention.

As illustrated in FIG. 1, the holder 10 mainly includes a holding member 20 that includes a holding portion 21 and a frame-shaped body portion 30, an anti-vibration member 50 that includes a frame-shaped portion 51, and a fixing member 80 that is provided with an insertion portion 81, locking portions 94, and a flange 95.

The frame-shaped portion 51 is inserted into the frame-shaped body portion 30 and the insertion portion 81 is inserted into the frame-shaped portion 51, so that the anti-vibration member 50 and the fixing member 80 are assembled in the holding member 20 as illustrated in FIGS. 14 to 17.

In the following description, an insertion direction in which the frame-shaped portion 51 is inserted into the frame-shaped body portion 30 is also referred to as a "frame-shaped portion insertion direction F1," as indicated by an arrow F1 of FIG. 1. An insertion direction in which the insertion portion 81 is inserted into the frame-shaped portion 51 is also referred to as an "insertion portion insertion direction F2," as indicated by an arrow F2 of FIG. 1.

An assembly state of the anti-vibration member 50 and the fixing member 80 in the holding member 20 is a state where the frame-shaped portion 51 is inserted into the frame-shaped body portion 30 up to a maximum insertion position and the insertion portion 81 is inserted into the frame-shaped portion 51 up to a maximum insertion position.

Figure 15:
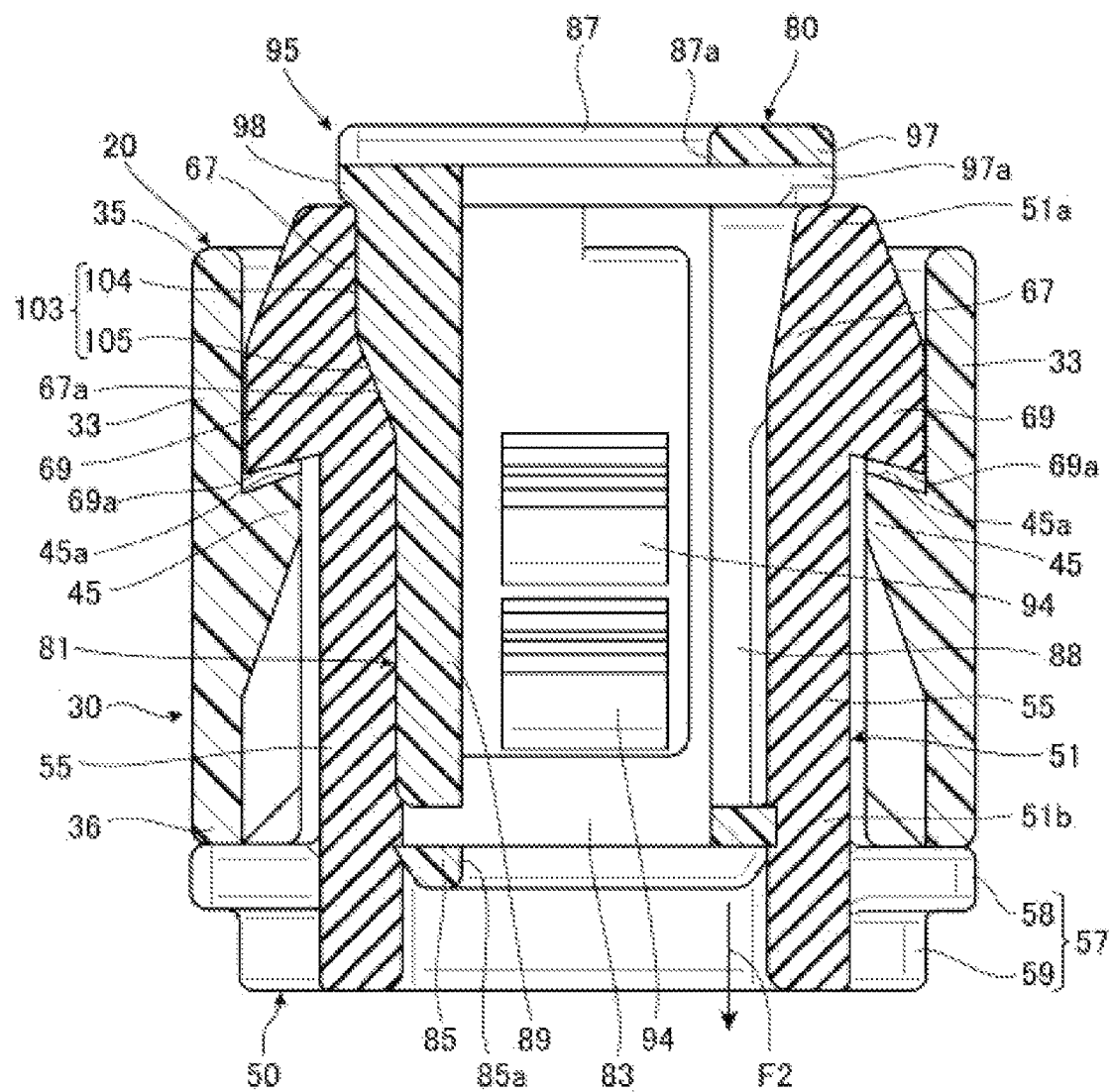
FIG. 15 is a sectional view taken along arrow line B-B of FIG. 2.

Further, as illustrated in FIG. 15, the second engagement portions 45 are provided in the frame-shaped body portion 30 of the holding member 20, and the third engagement portions 69 are provided in the frame-shaped portion 51 of the anti-vibration member 50. When the frame-shaped portion 51 is inserted into the frame-shaped body portion 30 from the side of the fixed member 1, as indicated by the arrow F1 of FIG. 1, the second engagement portions 45 and the third engagement portions 69 can engage with each other and the anti-vibration member 50 is assembled in the holding member 20, as illustrated in FIG. 15.

Figure 16:
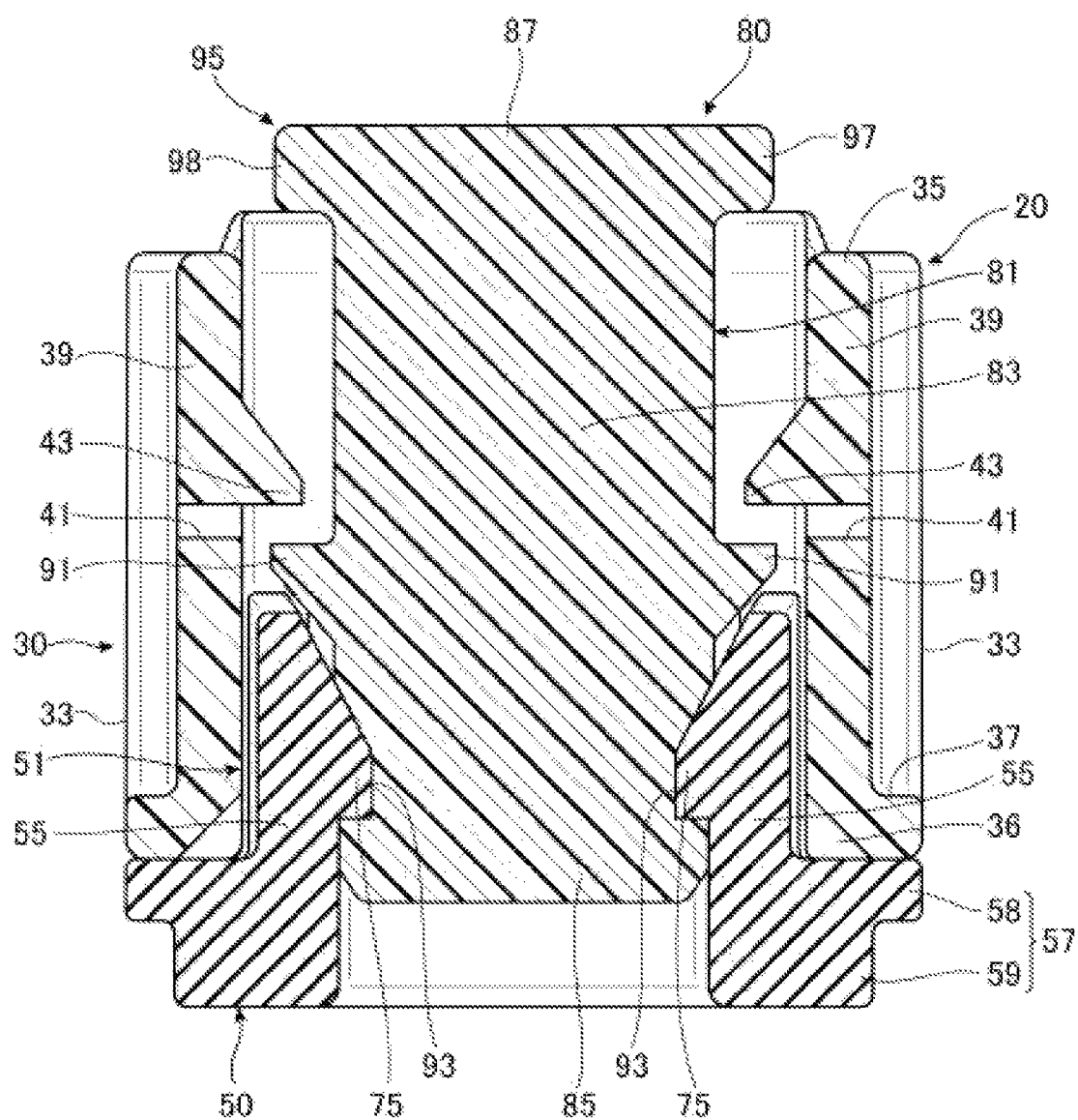
FIG. 16 is a sectional view taken along arrow line D-D of FIG. 2.

As illustrated in FIG. 16, first engagement portions 43 are provided in the frame-shaped body portion 30 of the holding member 20, and fifth engagement portions 91 are provided in the insertion portion 81 of the fixing member 80. Further, fourth engagement portions 75 are provided in the frame-shaped portion 51 of the anti-vibration member 50 and sixth engagement portions 93 are provided in the insertion portion 81 of the fixing member 80.

When the insertion portion 81 is inserted into the frame-shaped portion 51 from an opposite side to the fixed member 1, as indicated by the arrow F2 of FIG. 1, the first engagement portions 43 and the fifth engagement portions 91 face each other and can engage with each other, and the fourth engagement portions 75 and the sixth engagement portions 93 engage with each other, as illustrated in FIG. 16, so that the fixing member 80 is assembled in the anti-vibration member 50.

Next, each member included in the holder 10 will be described.

First, the holding member 20 will be described with reference to FIGS. 1 to 3 and 14 to 17, and the like. As illustrated in FIG. 1, the holding member 20 includes the frame-shaped body portion 30 connected to the holding portion 21 that holds the long member P.

The frame-shaped body portion 30 in the embodiment includes a pair of walls 31, 31 that face each other in parallel and a pair of walls 33, 33 which are orthogonal to the pair of walls 31, 31 and face each other, and has a substantially quadrangular frame shape in which one end 35 side and the other end 36 side are opened. The pair of walls 33, 33 serve as "frame-shaped body portion side walls" in the present invention.

The one end 35 side of the frame-shaped body portion 30 is a side away from the fixed member 1 and the other end 36 side of the frame-shaped body portion 30 is a side opposite to the one end 35 side and close to the fixed member 1 (a side facing the fixed surface 3 of the fixed member 1). The same also applies to "one end side" or "the other end side" in each portion (the frame-shaped portion 51 or the like) of the anti-vibration member 50 or each portion (the insertion portion 81 or the like) of the fixing member 80 to be described below, or the foregoing shat member 5.

The frame-shaped portion 51 is inserted from an opening on the other end 36 side of the frame-shaped body portion 30.

A pair of recessed portions 37, 37 that have a recessed groove shape at a predetermined depth from the outer surface are formed on both sides in the width direction (a direction orthogonal to an arrangement direction of the pair of walls 33, 33) and on a side of the outer surface of each wall 33 (a surface opposite to the inner surface of the frame-shaped body portion 30 oriented inward) (see FIG. 1). Each recessed portion 37 is opened on the one end 35 side of the frame-shaped body portion 30 and is closed on the other end 36 side, and extends with a given width from the one end 35 side to the other end 36 side.

Figure 2:
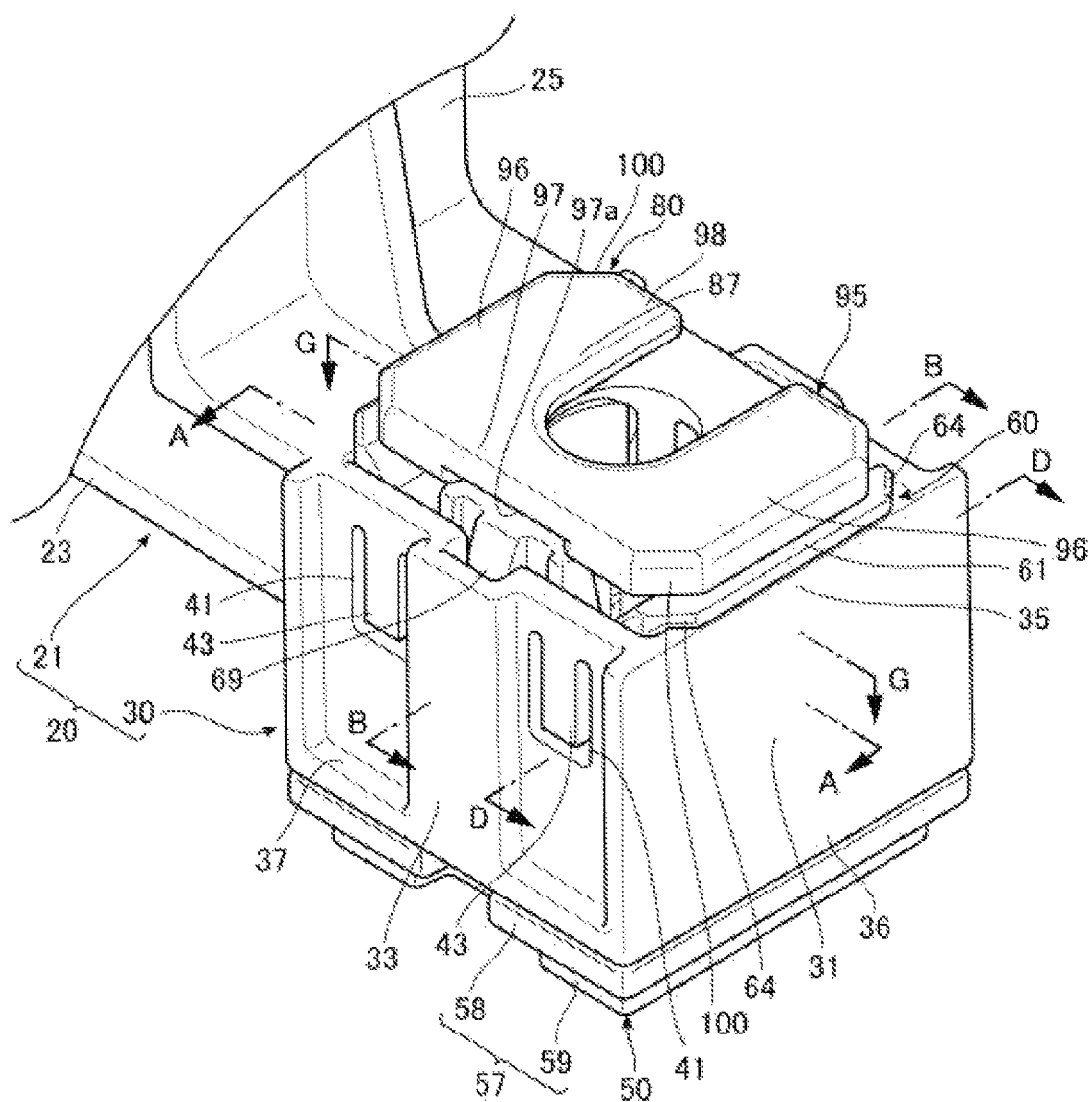
FIG. 2 is a perspective view illustrating assembled main portions of the holder.
Figure 3:
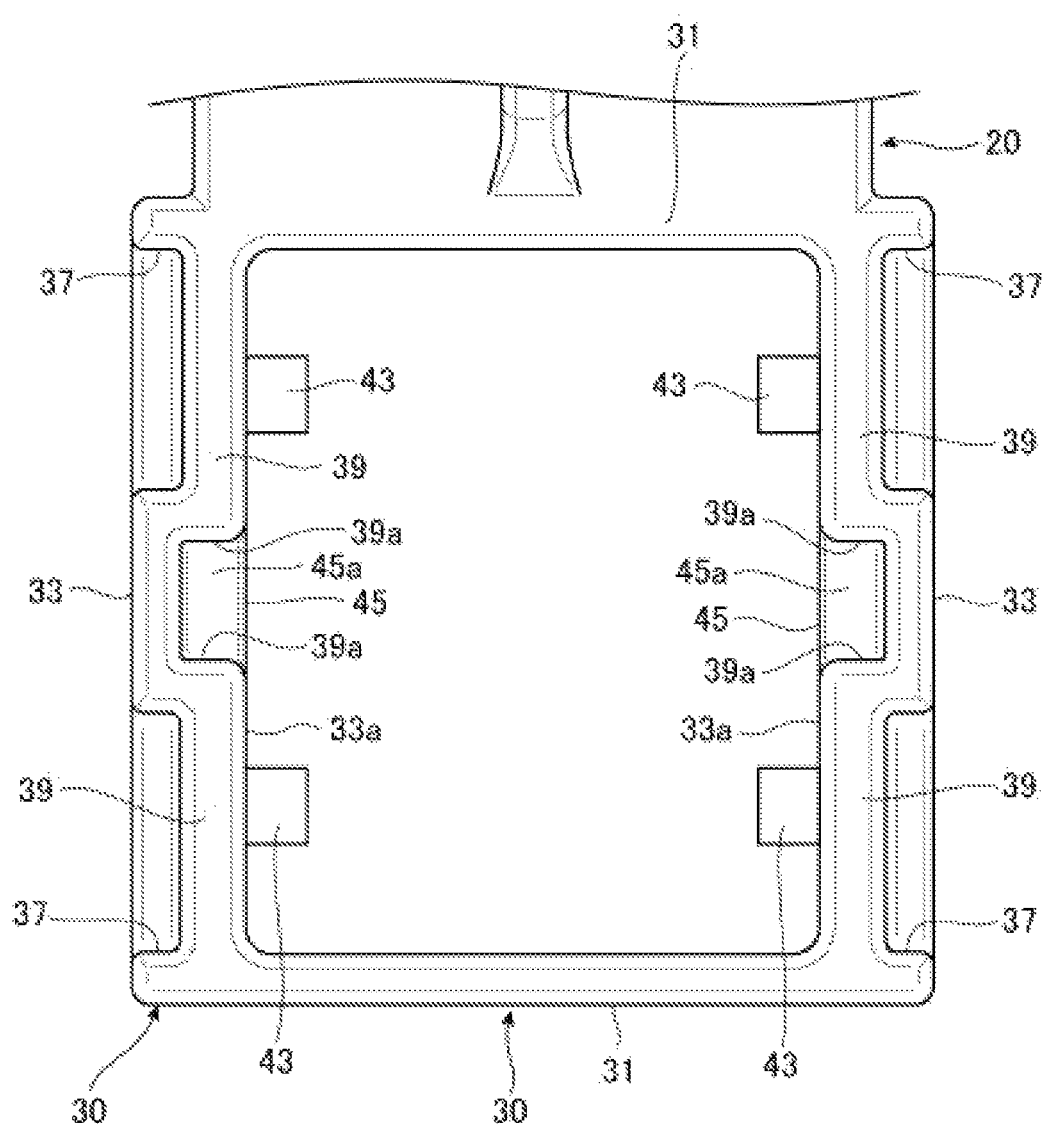
FIG. 3 is an enlarged plan view illustrating main portions of a frame-shaped body portion of a holding member included in the holder.

Further, as illustrated in FIG. 3, a pair of protrusions 39, 39 protrude inwards from the frame-shaped body portion 30 at positions of each wall 33 corresponding to the pair of recessed portions 37, 37. In each protrusion 39, a first engagement portion 43 that is bendable and deformable is provided via a U-shaped slit 41 (see FIG. 2). In the frame-shaped body portion 30 in the embodiment, four first engagement portions 43 are provided (see FIG. 3).

In each first engagement portion 43, a fixing end is connected to the one end 35 side of the frame-shaped body portion 30 and a free end is disposed on the other end 36 side of the frame-shaped body portion 30. The free end protrudes on the inner side of the frame-shaped body portion 30. The first engagement portion 43 faces the fifth engagement portion 91 provided in the fixing member 80 and can engage with the fifth engagement portion 91 (see FIG. 16).

As illustrated in FIG. 3, the second engagement portion 45 is provided at a portion between facing inner surfaces 39a, 39a of the pair of protrusions 39, 39 provided in each wall 33. As illustrated in FIG. 15, a surface 45a of the second engagement portion 45 on the one end 35 side of the frame-shaped body portion 30 (hereinafter also simply referred to as "one end surface 45a") has a tapered shape in which a protrusion amount gradually increases toward the inner side of the frame-shaped body portion 30 and toward the one end 35 side of the frame-shaped body portion 30. The second engagement portion 45 can engage with the third engagement portion 69 provided in the anti-vibration member 50 (see FIG. 15).

On the other hand, the holding portion 21 is consecutively connected to one wall 31 side of the pair of walls 31, 31 included in the frame-shaped body portion 30.

Figure 10:
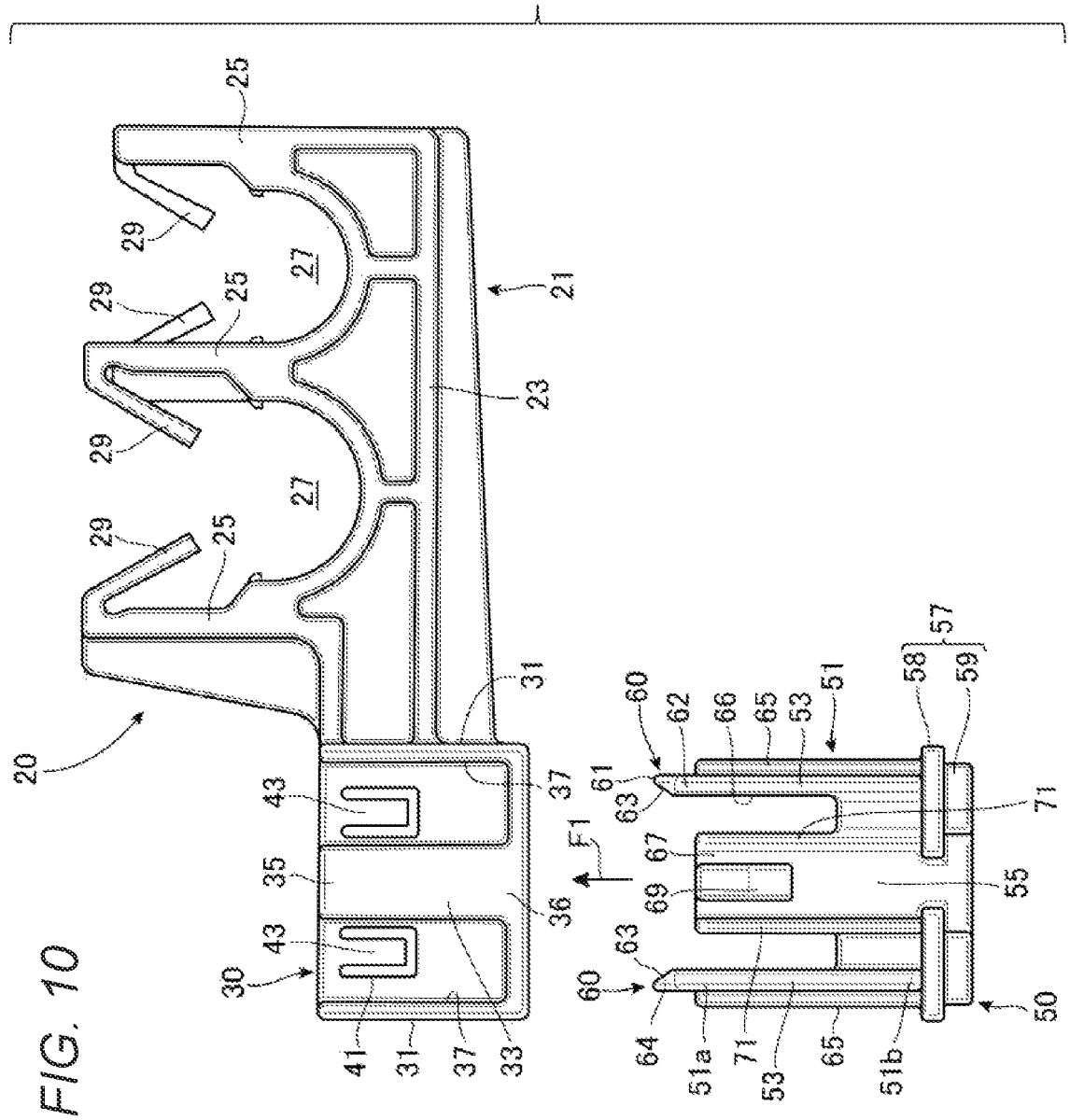
FIG. 10 is a diagram illustrating a first process in an assembly process of each member in the holder for the long member according to the present invention.

As illustrated in FIGS. 1 and 10, the holding portion 21 includes a bottom wall 23 that extends by a predetermined length in a direction orthogonal to an axial direction of the frame-shaped body portion 30 from a location of the wall 31 on the fixed surface 3 side, and a plurality of holding walls 25 that extend in the axial direction of the frame-shaped body portion 30 at a predetermined interval from the bottom wall 23.

As illustrated in FIG. 10, a plurality of holding spaces 27 are defined by the bottom wall 23 and the plurality of holding walls 25 to hold the long member P. Further, a plurality of holding claws 29 extend inwards slantly toward the bottom wall 23 from the inner surface of each holding wall 25 (a surface facing the holding space 27 side). As a result, a plurality of the long members P can be retained and held in the plurality of holding spaces 27.

Next, the anti-vibration member 50 will be described with reference to FIGS. 4, 5, 10, 14 to 17, and the like.

As illustrated in FIG. 1, the anti-vibration member 50 is made of an elastic material and includes the frame-shaped portion 51 inserted into the inner side of the frame-shaped body portion 30 from the fixed member 1 side. The frame-shaped portion 51 includes a wall 53 in which an extension piece 60 is provided and the wall 55 in which the extension piece 60 is not provided.

Figure 4:
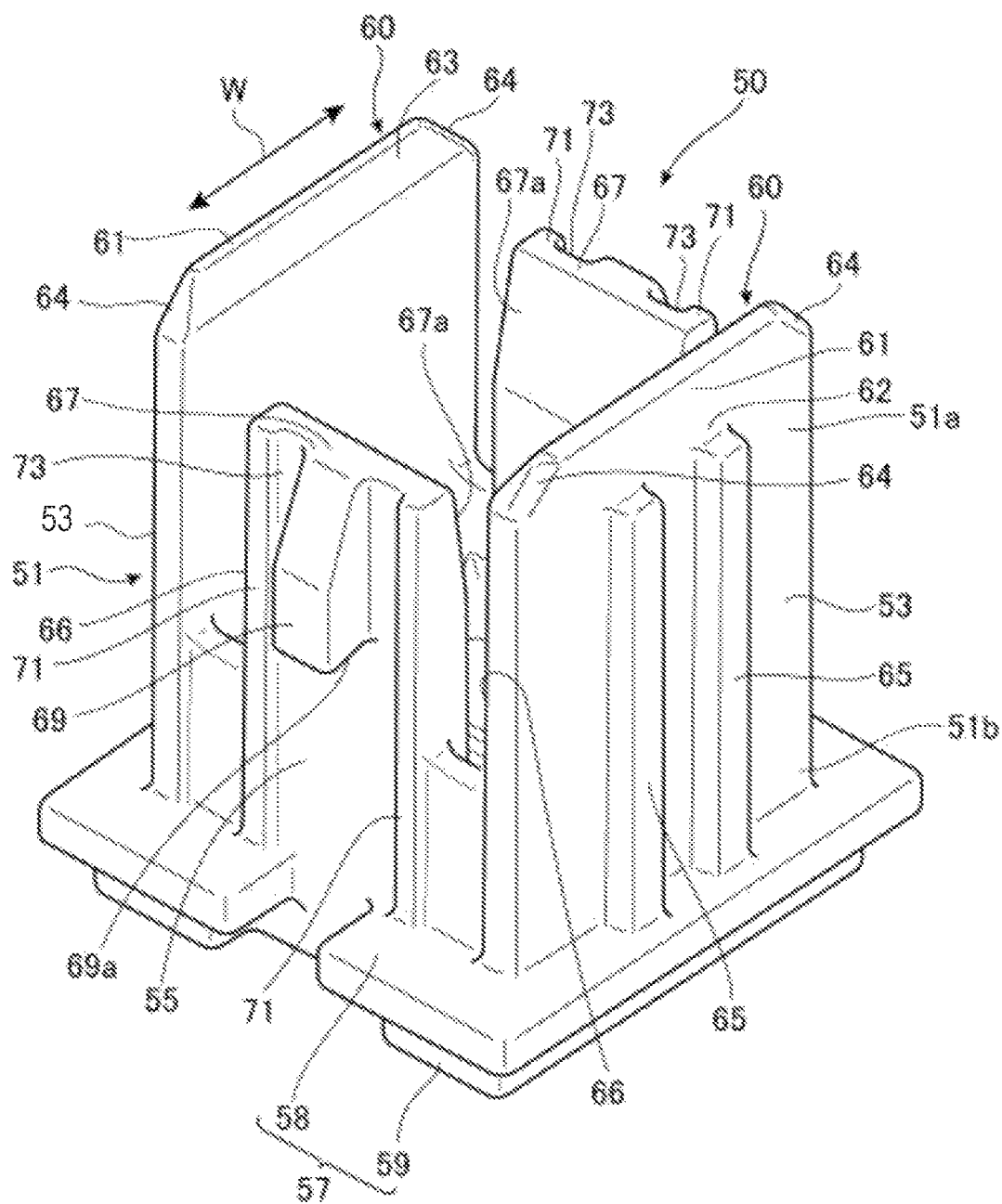
FIG. 4 is an enlarged perspective view illustrating an anti-vibration member included in the holder.
Figure 5:
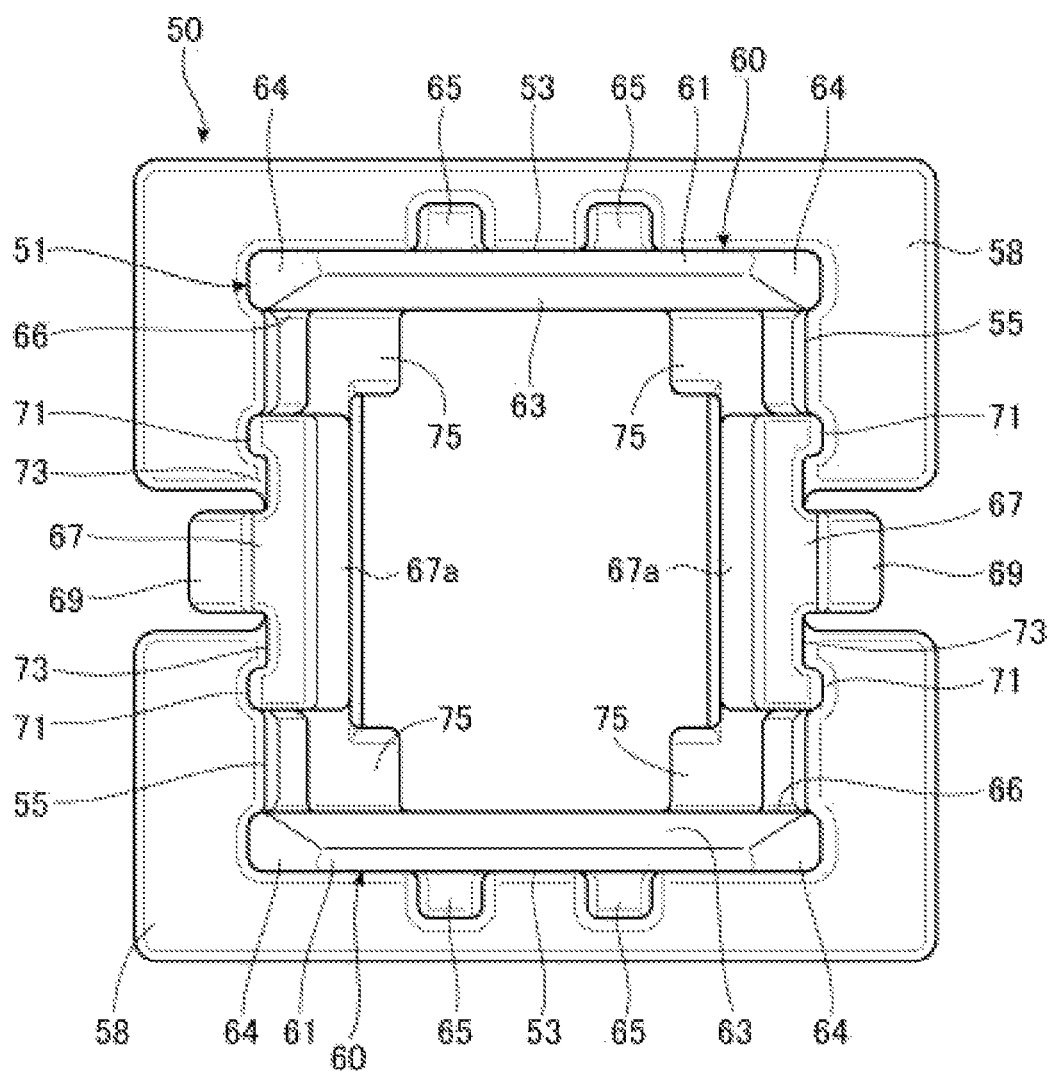
FIG. 5 is a plan view illustrating the anti-vibration member.

Referring together to FIGS. 4 and 5, the frame-shaped portion 51 in the embodiment includes a pair of walls 53, 53 facing each other in parallel and a pair of walls 55, 55 facing each other and orthogonal to the pair of walls 53, 53, and has a substantially quadrangular frame shape in which one end 51a side and the other end 51b side of the frame-shaped portion 51 are opened. The frame-shaped portion 51 is inserted into the frame-shaped body portion 30 from the one end 51a side and the insertion portion 81 of the fixing member 80 is inserted from an opening of the one end 51a side.

The frame-shaped portion 51 with a substantially quadrangular frame shape has a shape similar to and smaller than the frame-shaped body portion 30 with a substantially quadrangular frame shape.

Specifically, a width (a length in a direction orthogonal to an arrangement direction of the pair of walls 53, 53) of each wall 53 of the frame-shaped portion 51 is smaller than a width (a length in a direction orthogonal to an arrangement direction of the pair of walls 31, 31) of each wall 31 of the frame-shaped body portion 30. Further, the width (the length in the direction orthogonal to the arrangement direction of the pair of walls 53, 53) of each wall 53 of the frame-shaped portion 51 is smaller than a width (a length in the direction orthogonal to the arrangement direction of the pair of walls 33, 33) of each wall 33 of the frame-shaped body portion 30.

As a result, the frame-shaped portion 51 can be inserted into the frame-shaped body portion 30. In the insertion state, there is a predetermined gap between an entire inner circumference of the frame-shaped body portion 30 and an entire outer circumference of the frame-shaped portion 51.

A length (a length in the frame-shaped portion insertion direction F1) of the pair of walls 55, 55 included in the frame-shaped portion 51 is shorter than a length of the pair of walls 53, 53 in which the extension pieces 60 are provided. Here, as illustrated in FIG. 12, in a state where the frame-shaped portion 51 is inserted into the frame-shaped body portion 30, a portion of the wall 55 on the one end 51a side protrudes by a predetermined length from an opening of the frame-shaped body portion 30 on the one end 35 side.

Further, in the frame-shaped portion 51, a contact portion 57 that protrudes further than the other end 36 of the frame-shaped body portion 30 and comes into contact with the fixed member 1 is provided on the other end 51b side. The contact portion 57 includes a flange 58 with a thin plate shape that is overhung outwards from the outer circumference of the frame-shaped portion 51 on the other end 51b side and a pedestal 59 that protrudes from the surface of the flange 58 on the other end 51b side.

As indicated by the frame-shaped portion insertion direction F1 in FIG. 1, when the frame-shaped portion 51 is inserted into the frame-shaped body portion 30 from the fixed member 1 side to assemble the anti-vibration member 50 in the holding member 20, the flange 58 of the contact portion 57 of the frame-shaped portion 51 comes into contact with the end surface of the frame-shaped body portion 30 on the other end 36 side (see FIG. 11 or the like) so that the maximum insertion position of the frame-shaped portion 51 to be inserted into the frame-shaped body portion 30 is regulated. The pedestal 59 is a portion coming into contact with the fixed surface 3 of the fixed member 1 (see FIGS. 12 and 14).

The anti-vibration member 50 includes a pair of extension pieces 60, 60 that extend to protrude from the frame-shaped body portion 30 (see FIG. 11) in a state where the frame-shaped portion 51 is inserted into the frame-shaped body portion 30, and are sandwiched between the frame-shaped body portion 30 and the flanges 95 when the insertion portion 81 is inserted into the frame-shaped portion 51. The pair of extension pieces 60 are pressed to be able to be curved outwards by the flange 95 of the fixing member 80 or a part (in the embodiment, pressing surfaces 101 to be described below) of the insertion portion 81 when the insertion portion 81 is inserted into the frame-shaped portion 51, as indicated by the insertion portion insertion direction F2 in FIG. 1 (see FIG. 12).

As the extension pieces 60 will be described more specifically, each of the extension pieces 60, 60 extends from one end of each of the pair of walls 53, 53 included in the frame-shaped portion 51 (ends of the frame-shaped portion 51 on the one end 51a side).

As illustrated in FIG. 4 or 10, each extension piece 60 extends in the same direction as an extension direction of the wall 53 (the same direction as the axial direction of the shaft member 5) before the frame-shaped portion 51 is inserted into the frame-shaped body portion 30. Each extension piece 60 extends integrally and continuously from one end of the wall 53 to the wall 53 and extends straight to the wall 53 before the frame-shaped portion 51 is inserted into the frame-shaped body portion 30. Further, the extension piece 60 extends long further than the end of the wall 55 on the one end 51a side before the frame-shaped portion 51 is inserted into the frame-shaped body portion 30.

As illustrated in FIG. 4 or 10, a tapered surface 63 in which the thickness of the extension piece 60 is gradually thinned toward the forefront end of the extension piece 60 is formed at a distal end 61 (also referred to as one end of the extension piece 60) in an extension direction of each extension piece 60 on the inner surface side of the distal end 61 (as illustrated in FIG. 3, an inward surface of the frame-shaped body portion 30 before the frame-shaped portion 51 is inserted into the frame-shaped body portion 30) side. Further, the pair of extension pieces 60, 60 protrude from the opening of the frame-shaped body portion 30 on the one end 35 side in the state where the frame-shaped portion 51 is inserted into the frame-shaped body portion 30 (see FIG. 11).

Figure 12:
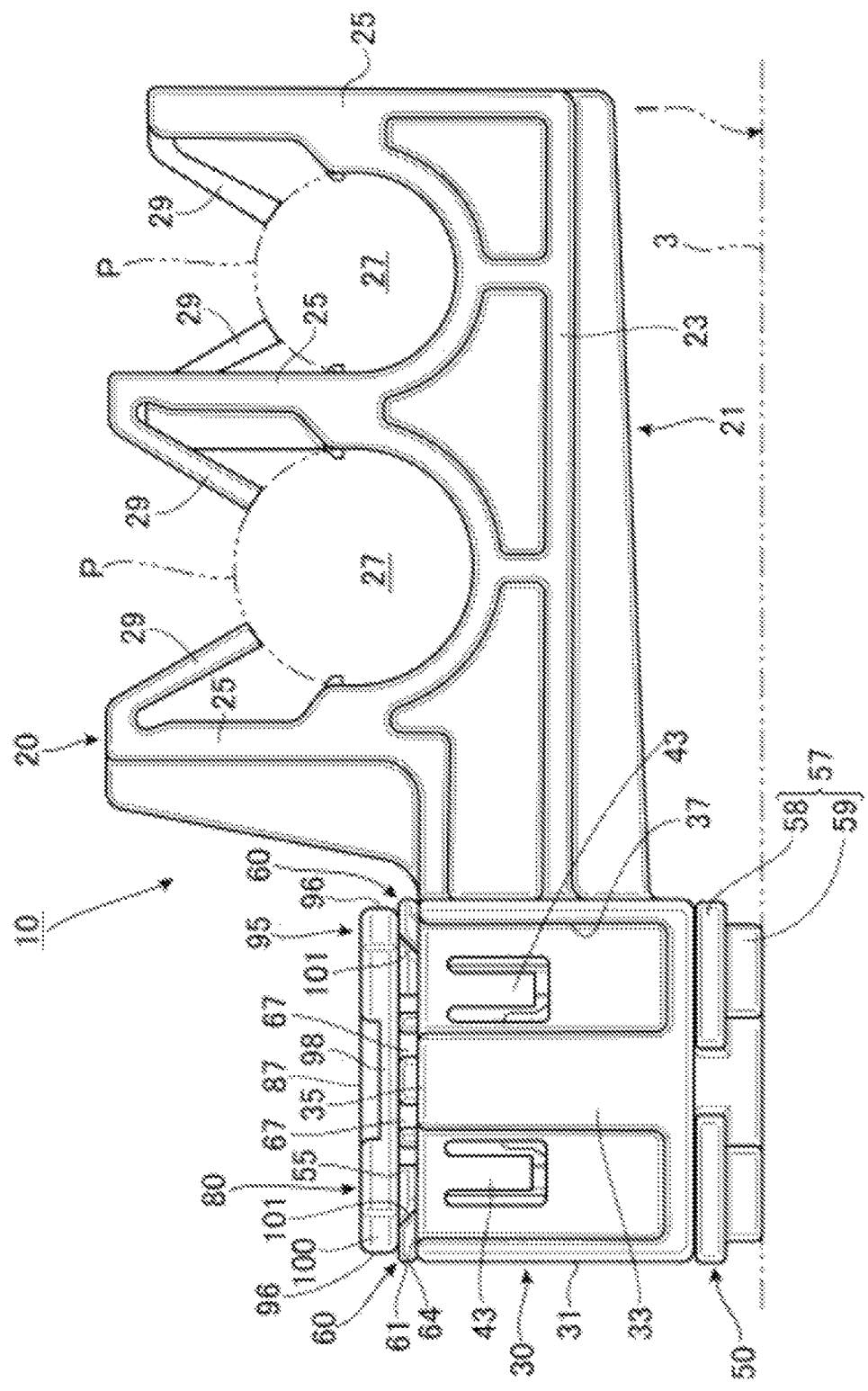
FIG. 12 is a diagram illustrating a third process in the assembly process.

The distal end 61 of each extension piece 60 is pressed by the flange 95 of the fixing member 80 or a part (the pressing surface 101) of the insertion portion 81, so that the pair of extension pieces 60, 60 are curved and deformed outwards and the distal ends 61, 61 are separated from each other with a base end (also referred to as the other end and indicating a connection portion or a boundary portion with the one end of the wall 53) of each extension piece 60 as a starting point (see FIG. 12).

That is, after the frame-shaped portion 51 is inserted into the frame-shaped body portion 30, when the insertion portion 81 of the fixing member 80 is inserted into the frame-shaped portion 51 as indicated by the insertion portion insertion direction F2 in FIG. 11, the tapered surface 63 of the inner surface of the distal end 61 is pressed by the pressing surface 101 provided in a part of the insertion portion 81, as will be described below, and each extension piece 60 is bent and deformed to be curved outwards with the base end 62 of the extension piece 60 as a starting point (see FIG. 12). In other words, the pair of extension pieces 60, 60 can be pressed apart by the pair of pressing surfaces 101, 101, and thus the distal ends 61, 61 can be separated from each other to be pressed apart.

As described above, in the state where the pair of extension pieces 60, 61) are pressed apart, as illustrated in FIG. 14, the outer surfaces (surfaces opposite to the inner surface) of the distal ends 61 of the extension pieces 60 come into contact with the ends of the pair of walls 31, 31 included in the frame-shaped body portion 30 on the one end 35 side, and the flanges 95 (here, first flanges 96) come into contact with and are placed on the inner surfaces of the distal ends 61 of the extension pieces 60.

That is, in a state where the frame-shaped portion 51 is inserted into the frame-shaped body portion 30 and the insertion portion 81 is inserted into the frame-shaped portion 51, and the anti-vibration member 50 and the fixing member 80 are assembled in the holding member 20, the distal ends 61 of the extension pieces 60 are sandwiched between the frame-shaped body portion 30 and the flanges 95.

As illustrated in FIG. 4, both sides of the distal end 61 of each extension piece 60 in a width direction W are notched as extension piece-side tapered portions 64, 64 and the width of the distal end 61 is narrowed. The width direction W of the extension piece 60 is a direction orthogonal to the thickness direction and the extension direction of the extension piece 60.

In the distal end 61 of the extension piece 60 in the embodiment, both sides in the width direction are notched by the extension piece-side tapered portions 64 at an inclination angle of 45° (so-called C-chamfered). As a result, the distal end 61 has a width narrower than a portion other than the distal end 61, that is, has a short length in the width direction W.

On the outer surface of the wall 53, first protrusion ridges 65 which are protrusion ridges extending in the extension direction and coming into contact with the inner surface of the frame-shaped body portion 30 are formed with a length which does not reach the distal end 61 (one end) of the extension piece 60.

In the embodiment, in the intermediate portion of the outer surface (a surface opposite to the inner surface of the frame-shaped portion 51 oriented inward) of each wall 53 in the width direction, the pair of first protrusion ridges 65, 65 extend in parallel to each other in the extension direction of the wall 53. Each first protrusion ridge 65 extends by a length in which the other end is connected to the flange 58 included in the contact portion 57 and one end does not reach the base end of the extension piece 60.

Figure 17:
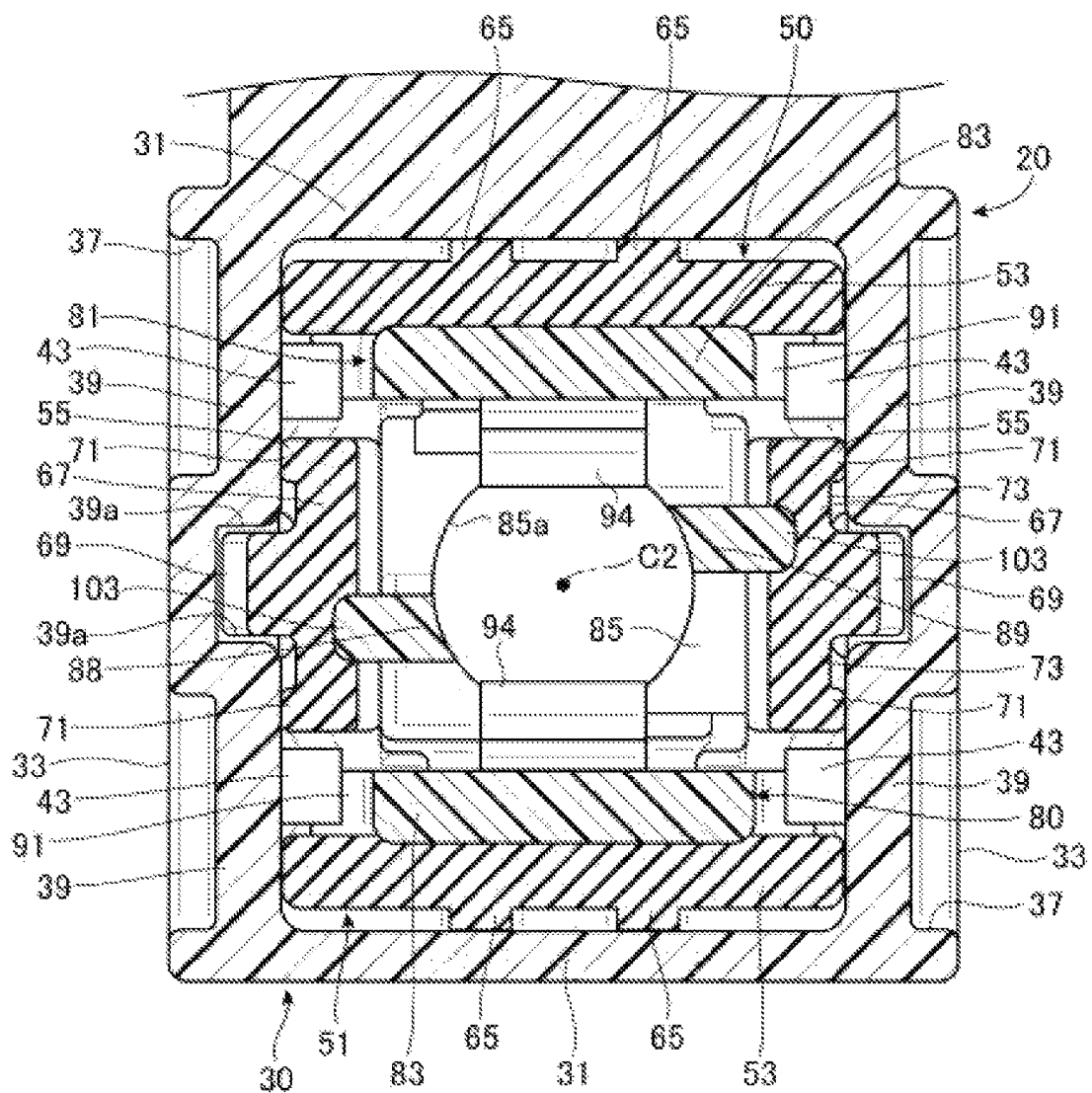
FIG. 17 is a sectional view taken along arrow line G-G of FIG. 2.

When the frame-shaped portion 51 is inserted into the frame-shaped body portion 30, as illustrated in FIG. 17, the first protrusion ridge 65 comes into contact (also comes into pressing contact) with the inner surface of the wall 31 included in the frame-shaped body portion 30. The first protrusion ridge 65 serves as a "protrusion ridge" in the present invention.

Within a predetermined range which reaches the base end (the other end) side from the distal end (one end) of each wall 55 in the extension direction, a pair of slits 66, 66 extending in parallel to each other are formed, and each of bendable and deformable elastic pieces 67 is formed via the pair of slits 66, 66. As illustrated in FIG. 4, on the inner surface (an inward surface of the frame-shaped portion 51) of the distal end (one end) of each elastic piece 67, each tapered surface 67a in which the elastic piece 67 is gradually thinned toward the one end 51a of the frame-shaped portion 51 is formed.

Further, the third engagement portion 69 protrudes at the distal end of each elastic piece 67 in the intermediate portion of the outer surface (the surface opposite to the inner surface) of the distal end in the width direction. As illustrated in FIG. 15, a surface 69a of the third engagement portion 69 (hereinafter also simply referred to as "the other end surface 69a") facing the other end 51b side of the frame-shaped portion 51 has a so-called inverted tapered shape in which a protrusion amount gradually increases toward the outside of the frame-shaped portion 51 and toward the other end 51b side of the frame-shaped portion 51.

The other end surface 69a of the third engagement portion 69 faces the one end surface 45a of the second engagement portion 45 provided in the frame-shaped body portion 30 (see FIG. 15), and the third engagement portion 69 can engage with the second engagement portion 45.

Further, as illustrated in FIG. 15, a pressing protrusion 103 of the fixing member 80, as will be described below, comes into pressing contact with the inner surface of the elastic piece 67.

The slits 66 form the elastic pieces 67 and also have the following role. That is, as indicated by the frame-shaped portion insertion direction F1 in FIG. 1, when the frame-shaped portion 51 is inserted into the frame-shaped body portion 30 from the fixed member 1 side and the holding member 20 and the anti-vibration member 50 are assembled, the first engagement portions 43 are moved into the slits 66. Further, as indicated by the insertion portion insertion direction F2 in FIG. 1, when the insertion portion 81 is inserted into the frame-shaped portion 51 from the opposite side to the fixed member 1 and the anti-vibration member 50 and the fixing member 80 are assembled, the fifth engagement portions 91 provided in the insertion portion 81 are also moved into the slits 66.

In both side edges in the width direction on the outer surface of the elastic piece 67, a pair of second protrusion ridges 71, 71 which are protrusion ridges extending in the insertion portion insertion direction F2 are provided. Each second protrusion ridge 71 extends on the outer surface of the wall 55 beyond a base end of the elastic piece 67 from one end of the elastic piece 67, and the other end thereof is connected to the flange 58 included in the contact portion 57. That is, it is also said that the second protrusion ridge 71 extends to the outer surface of the elastic piece 67 and the outer surface of the wall 55.

When the frame-shaped portion 51 is inserted into the frame-shaped body portion 30, as illustrated in FIG. 17, the second protrusion ridge 71 comes into pressing contact (also comes into contact) with the inner surface of the wall 33 included in the frame-shaped body portion 30.

That is, as illustrated in FIG. 15, in the state where the inner surface of the elastic piece 67 is pressed by the pressing protrusion 103, as illustrated in FIG. 17, the outer surface of the second protrusion ridge 71 provided on the outer surface of the elastic piece 67 comes into pressing contact with the inner surface of the frame-shaped body portion 30, that is, the inner surface of the wall 33 included in the frame-shaped body portion 30.

A recessed groove 73 with a recessed groove shape is formed at a portion between each second protrusion ridge 71 and the third engagement portion 69 adjacent thereto on the outer surface of the elastic piece 67. As illustrated in FIG. 17, the recessed grooves 73 are separated from the inner surface (here, the inner surface of the wall 33) of the frame-shaped body portion 30 when the frame-shaped portion 51 is inserted into the frame-shaped body portion 30.

Further, as illustrated in FIG. 16, the fourth engagement portions 75 are provided at positions near the other end 51b on the inner surfaces of the pair of walls 55, 55 included in the frame-shaped portion 51. Referring together to FIG. 5, the pair of fourth engagement portions 75, 75 protrudes from both sides of the inner surface of each wall 55 in the width direction. That is, the anti-vibration member 50 in the embodiment includes a total of four fourth engagement portions 75. The fourth engagement portions 75 can engage with the sixth engagement portions 93 provided in the fixing member 80 (see FIG. 16).

Next, the fixing member 80 will be described with reference to FIGS. 6 to 9, 13 to 17, and the like.

The fixing member 80 includes the insertion portion 81 that is inserted into the frame-shaped portion 51 and receives the shaft member 5, the locking portions 94 that are provided inside the insertion portion 81 and are locked to the shaft member 5, and the flange 95 that is overhung on one end side 81a side of the insertion portion 81.

The insertion portion 81 in the embodiment includes a pair of first extension portions 83, 83 that have a long plate shape extending by a predetermined length in the insertion direction F2 in which the insertion portion 81 is inserted into the frame-shaped portion 51 (insertion portion insertion direction F2) and face each other in parallel, a distal end 85 that is connected to distal ends of the pair of first extension portions 83, 83 (the end of the insertion portion 81 on the other end 81b side), and a push-in portion 87 that is connected to the base ends of the pair of first extension portions 83, 83 (the end of the insertion portion 81 on the one end 81a side), has a substantially quadrangular plate shape, and is a portion that is pushed by a worker assembling the holder 10.

Figure 8:
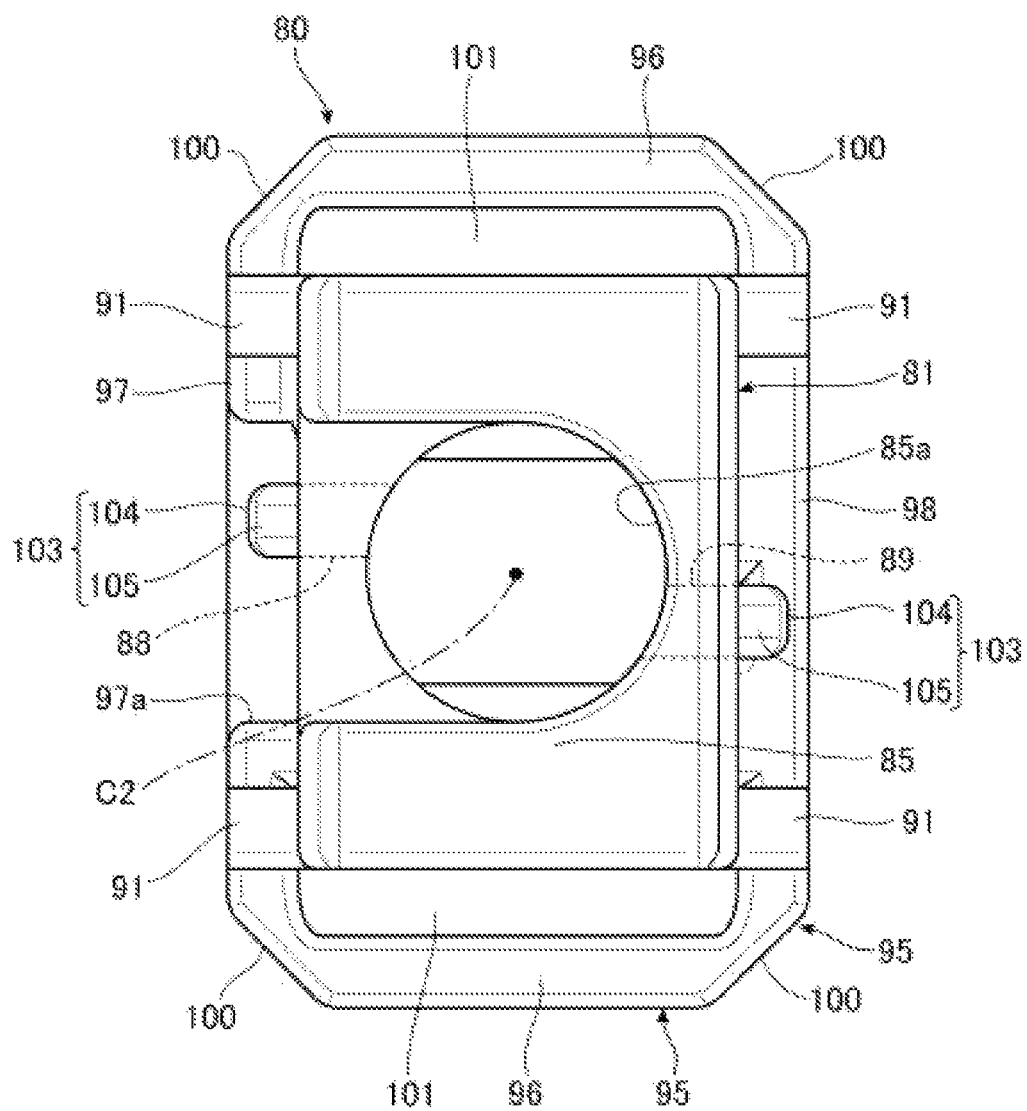
FIG. 8 is a bottom view illustrating the fixing member.
Figure 9:
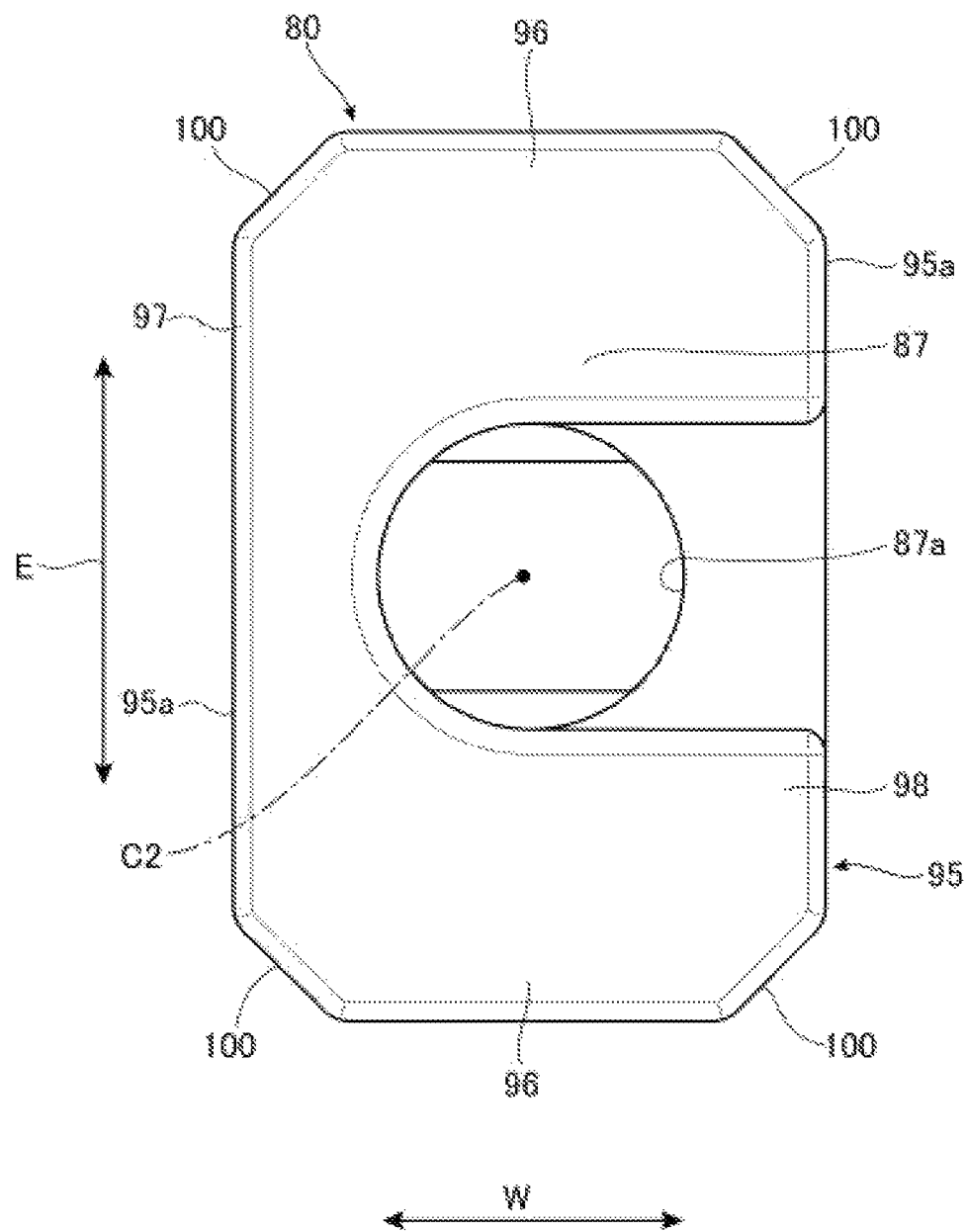
FIG. 9 is a plan view illustrating the fixing member.

In the intermediate portions of the push-in portion 87 and the distal end portion 85, circular shaft holes 85a and 87a into which the shaft member 5 is inserted are formed, respectively (see FIGS. 8 and 9). A portion passing through the center of the shaft holes 85a and 87a is a center C2 (see FIG. 17) of the insertion portion 81.

Further, the pair of second extension portions 88 and 89 extending in a columnar shape along the insertion portion insertion direction F2 are disposed between the distal end 85 and the push-in portion 87 at positions which do not interfere with the shaft member 5 inserted into the shaft holes 85a and 87a. The distal end 85 and the push-in portion 87 are connected to each other by the pair of second extension portions 88 and 89, and thus the entire fixing member 80 is reinforced.

As illustrated in FIG. 17, the pair of second extension portions 88 and 89 positionally deviate to be separated from each other with respect to the center C2 of the insertion portion 81 when the insertion portion 81 is viewed from the cross-section orthogonal to the axial direction. Here, the second extension portion 88 which is on one side positionally deviates to the downside of a paper surface of FIG. 17 with respect to the center C2 of the insertion portion 81, and the second extension portion 89 which is on the other side positionally deviates to the upside of the paper surface of FIG. 17 with respect to the center C2 of the insertion portion 81.

Figure 6:
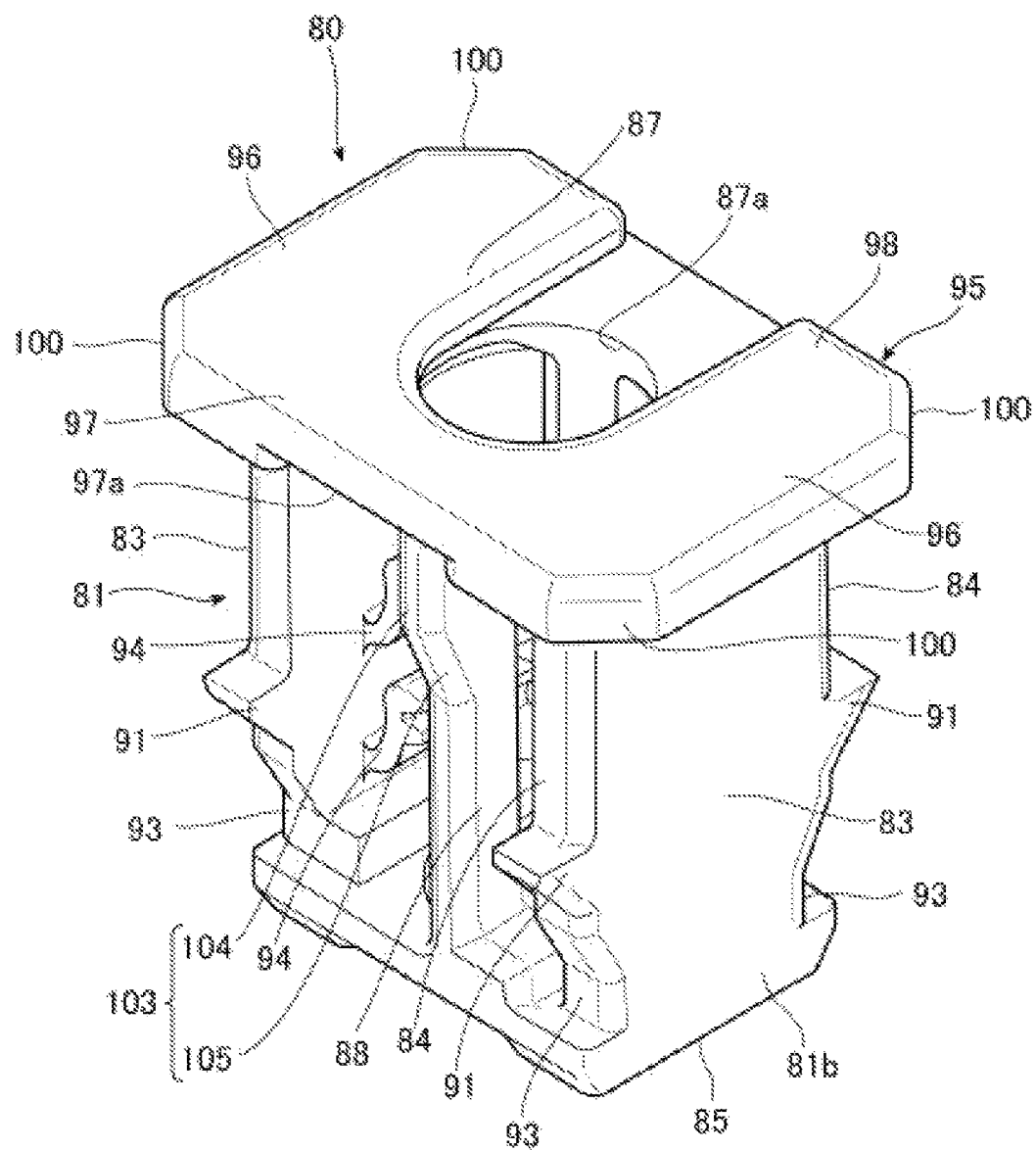
FIG. 6 is an enlarged perspective view illustrating a fixing member included in the holder for the long member according to the present invention.

Further, as illustrated in FIGS. 1 and 6, the fifth engagement portions 91 engaging the first engagement portions 43 of the holding member 20 and the sixth engagement portions 93 engaging with the fourth engagement portions 75 of the anti-vibration member 50 are provided on the outer surface of the insertion portion 81.

In the embodiment, the fifth engagement portions 91, 91 protrude in a planar direction of each first extension portion 83 (a direction orthogonal to an arrangement direction of the pair of first extension portions 83, 83 and along the outer surface of the first extension portions 83) from predetermined positions of both side edges 84, 84 (see FIG. 6) located on both sides of each first extension portion 83 included in the insertion portion 81 in the width direction (the direction orthogonal to the arrangement direction of the pair of first extension portions 83, 83).

The sixth engagement portions 93, 93 are formed at positions closer to the fixed member 1 than the fifth engagement portions 91, specifically, positions close to the end (the distal end 85) in the insertion portion insertion direction F2, on both the side edges 84, 84 of each first extension portion 83.

In the insertion portion 81, four fifth engagement portions 91 and four sixth engagement portions 93 are provided. As illustrated in FIG. 16, the fifth engagement portions 91 face the first engagement portions 43 provided in the frame-shaped body portion 30 of the holding member 20, and thus can engage with the first engagement portions 43. On the other hand, the sixth engagement portions 93 can engage with the fourth engagement portions 75 provided in the anti-vibration member 50.

Figure 7:
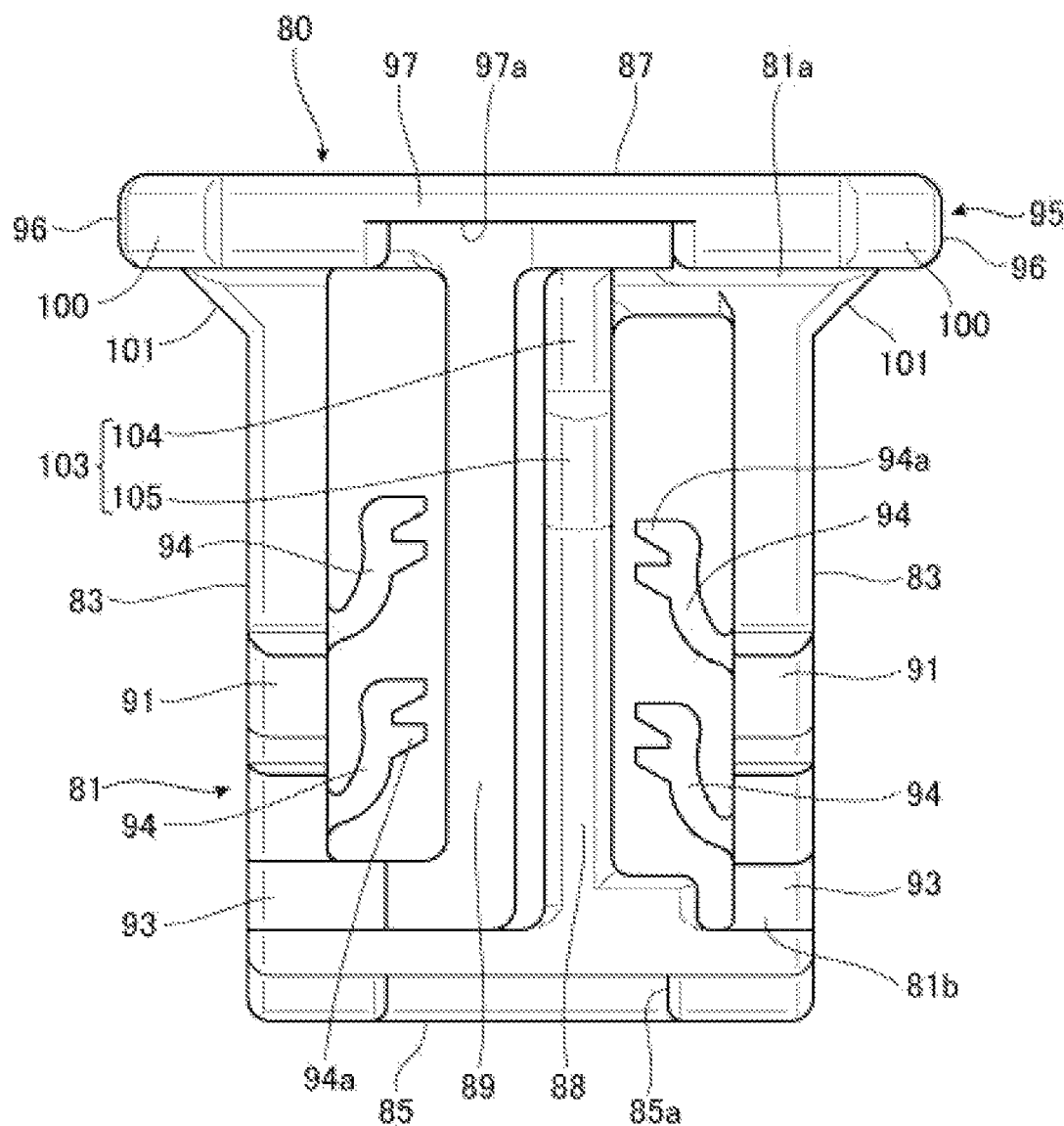
FIG. 7 is a side view illustrating the fixing member.

As illustrated in FIG. 7, the fixing member 80 includes the plurality of locking portions 94 locked to the shaft member 5. Each locking portion 94 has a shape extending slantly inwards to the one end 81a side of the insertion portion 81 from the inner surface (a surface facing the inner space of the insertion portion 81) of the first extension portion 83 and the plurality of locking portions 94 are provided in each first extension portion 83.

As illustrated in FIG. 14, a distal end 94a of each locking portion 94 in the extension direction is locked to the shaft member 5 (here, the distal end 94a is locked to a screw groove of a stud bolt which is the shaft member 5). As a result, the holder 10 is fixed to the fixed member 1 via the shaft member 5.

The flange 95 is overhung from the outer circumference of the one end 81a in the push-in portion 87 included in the insertion portion 81.

As illustrated in FIGS. 6 and 8, the flange 95 in the embodiment includes a pair of first flanges 96 that are an outer circumference of the one end 81a of the push-in portion 87 and are overhung from portions in which the pair of first extension portions 83, 83 are disposed and a pair of second flanges 97 and 98 that are an outer circumference of the one end 81a of the push-in portion 87 and are orthogonal to the pair of first flanges 96, 96 and overhung from portions in which the pair of second extension portions 88 and 89 are disposed. The second flange 97 is disposed on the second extension portion 88 side and the second flag 98 is disposed on the second extension portion 89 side (see FIG. 8).

As illustrated in FIGS. 2 and 12, both sides on the rear surface (the surface facing the frame-shaped body portion 30) side of the pair of second flanges 97 and 98 in the width direction come into contact with and are placed on the inner surfaces of the distal ends 61, 61 of the pair of extension pieces 60, 60. The intermediate portion on the rear surface side of the second flange 98 in the width direction comes into contact with and is placed on the end of a predetermined wall 55 included in the frame-shaped portion 51 on the one end 51a side.

On the other hand, as illustrated in FIGS. 6 and 7, a recessed portion 97a is formed in the intermediate portion of the second flange 97 in the width direction on the rear surface side of the second flange 97. Therefore, the intermediate portion of the second flange 97 in the width direction on the rear surface side does not come into contact with the end of a predetermined wall 55 included in the frame-shaped portion 51 on the one end 51a side (see FIG. 15).

As illustrated in FIG. 9, when the fixing member 80 is viewed in a planar direction (when viewed in the insertion portion insertion direction F2), the flange 95 has a substantially rectangular shape of which the outer circumference extends by a predetermined length. A direction in which the flange 95 extends is referred to as an extension direction E and a direction orthogonal to the extension direction E is referred to as a width direction W.

Further, the flange 95 and the frame-shaped body portion 30 have the following relationship.

Figure 13:
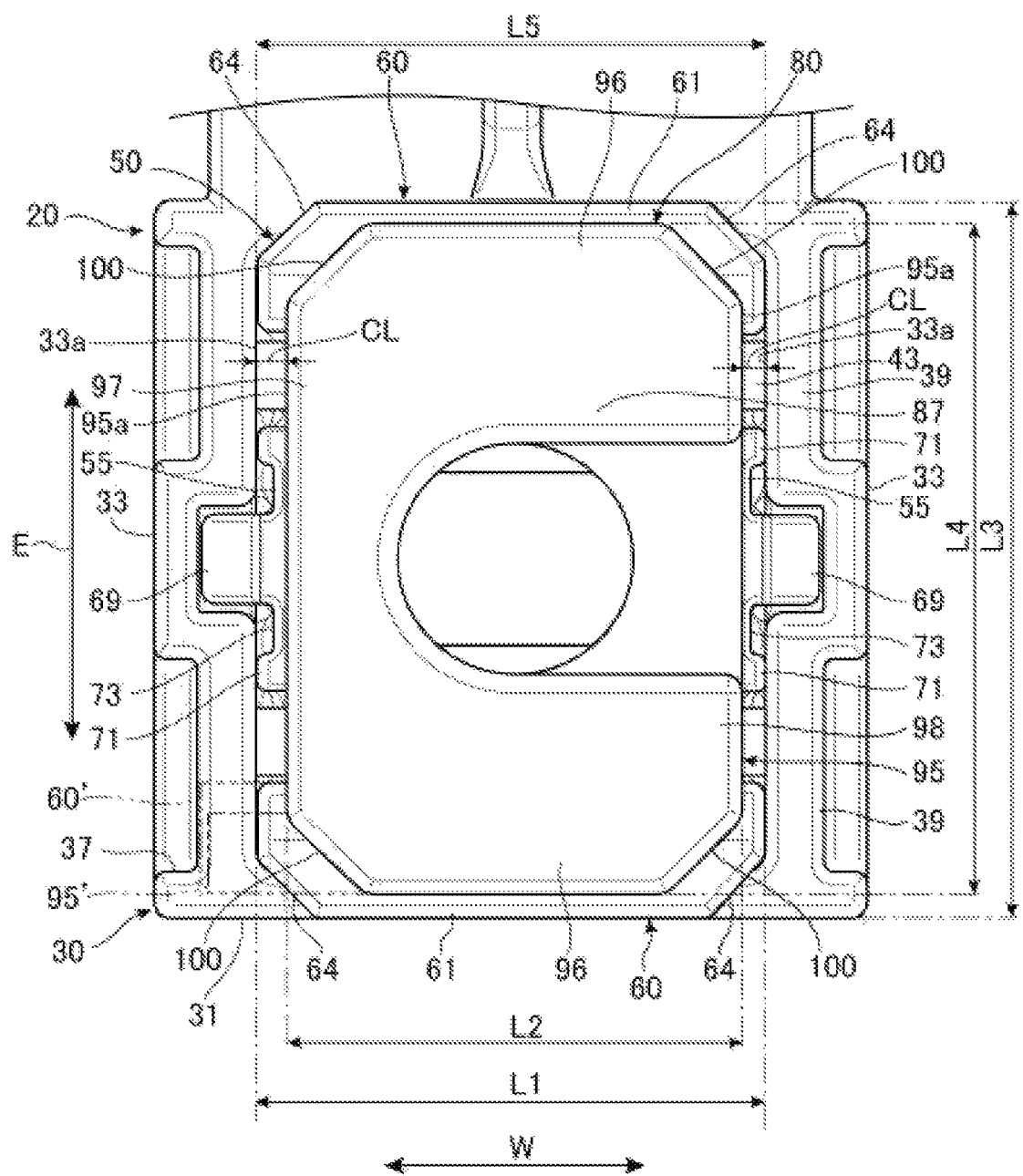
FIG. 13 is an enlarged plan view illustrating main portions of the assembled members in the holder for the long member according to the present invention.

As illustrated in FIG. 13, clearances CL, CL are provided between the inner surfaces 33a, 33a of the walls 33, 33 forming frame-shaped body portion side walls in the present invention facing the walls 55, 55 of the anti-vibration member 50 in which the pair of extension pieces 60, 60 are not provided in the frame-shaped body portion 30, when viewed in the insertion portion insertion direction F2, and outer edges 95a, 95a of the flanges 95 facing the walls 33, 33 (located at positions corresponding to the walls 33).

In the embodiment, as illustrated in FIG. 13, the clearance CL is provided between the outer edge 95a of one second flange 97 included in the flange 95 and the inner surface 33a of one wall 33 included in the frame-shaped body portion 30, and the clearance CL is provided between the outer edge 95a of the other second flange 97 included in the flange 95 and the inner surface 33a of the other wall 33 included in the frame-shaped body portion 30.

The flange 95 is formed with a width narrower than the width of the extension piece 60 provided in the anti-vibration member 50.

That is, as illustrated in FIG. 13, when the holder 10 is viewed in the planar direction (when viewed in the insertion portion insertion direction F2), a length L2 of each first flange 96 included in the flange 95 in the width direction W is shorter than a length L1 of the extension piece 60 in the width direction W.

As illustrated in FIG. 13, the width of the second flanges 97 and 98, that is, a length L4 of the flange 95 in the extension direction E (also a maximum length of the outer edges of the pair of first flanges 96, 96), is shorter than a length L3 between the pair of extension pieces 60, 60 (a maximum length between the outer edges of the pair of extension pieces 60, 60).

As a result, in a state where the frame-shaped portion 51 is inserted into the frame-shaped body portion 30, the insertion portion 81 is inserted into the frame-shaped portion 51, and the anti-vibration member 50 and the fixing member 80 are assembled in the holding member 20, that is, in a state where the pair of extension pieces 60, 60 are pressed apart by the flange 95 or a part (the pressing surfaces 101) of the insertion portion 81 (see FIGS. 12 and 14), as illustrated in FIG. 13, the flange 95 is not overhung (does not protrude) from the outer circumferential edges of the pair of extension pieces 60, 60.

Further, the flanges 95 are formed with a width narrower than an inner dimension of the frame-shaped body portion 30 in the width direction W of the extension pieces 60.

In the embodiment, as illustrated in FIG. 13, the length L2 of the first flange 96 included in the flange 95 in the width direction W is shorter than an inner dimension L5 between the pair of walls 33, 33 included in the frame-shaped body portion 30 (a minimum width between the inner surfaces of the pair of walls 33, 33).

The flange 95 is shorter than the distal end 61 of the extension piece 60 in the state where the extension piece 60 is curved outwards.

In the embodiment, as illustrated in FIG. 13, in the state where the pair of extension pieces 60, 60 are pressed apart by the flange 95 or a part (the pressing surfaces 101) of the insertion portion 81, the distal ends of the pair of first flanges 96, 96 included in the flanges 95 are shorter than the distal ends 61, 61 of the pair of extension pieces 60, 60.

Further, as illustrated in FIG. 13, in the flange 95, flange-side tapered portions 100 are formed at a position corresponding to the extension piece-side tapered portions 64 when viewed from the insertion direction in which the insertion portion 81 is inserted into the frame-shaped portion 51 (the insertion portion insertion direction F2).

In the embodiment, as illustrated in FIG. 13, when viewed in the insertion portion insertion direction F2, a connection portion (boundary portion) between a predetermined first flange 96 and the second flange 97 adjacent to the first flange 96 is notched (so-called C-chamfered) by the flange-side tapered portion 100 formed at an inclination angle of 45°.

As illustrated in FIG. 13, the flange-side tapered portions 100, 100 located at both ends of the flanges 95 in the extension direction E on both sides in the width direction W are provided at positions corresponding to the extension piece-side tapered portions 64, 64 formed on both sides of the distal ends 61 of the extension pieces 60 in the width direction W. Further, a predetermined flange-side tapered portion 100 has a shape smaller than and similar to the extension piece-side tapered portion 64 at a corresponding position.

As illustrated in FIG. 7, a pressing surface 101 that has a tapered shape, presses the inner surface of the distal end 61 of the extension piece 60, and curves the extension piece 60 outwards is formed at the end of the insertion portion 81 on the flange 95 side.

In the embodiment, at ends of the flanges 95 of the pair of first extension portions 83, 83 included in the insertion portion 81 (ends of the insertion portion 81 on the one end 81a side), that is, on the outer surfaces of connection portions (boundary portions) between the first extension portions 83 and the corresponding first flanges 96, the pressing surfaces 101 inclined in a tapered shape gradually increase toward the flange 95 side. In the embodiment, the pair of pressing surfaces 101, 101 are provided.

After the frame-shaped portion 51 is inserted into the frame-shaped body portion 30, when the insertion portion 81 is inserted and pushed into the frame-shaped portion 51, the pair of pressing surfaces 101, 101 first press the inner surfaces (here, the tapered surfaces 63, 63) of the distal ends 61, 61 of the pair of extension pieces 60, 60 and press apart the pair of extension pieces 60, 60 (see FIGS. 12 and 14).

Further, the pressing protrusions 103, 103 protrude in portions opposite to the insertion portion insertion direction F2 on the outer surfaces of the pair of second extension portions 88 and 89. When the frame-shaped portion 51 is inserted into the frame-shaped body portion 30 and the insertion portion 81 is inserted into the frame-shaped portion 51, the pressing protrusions 103, 103 press the inner surface of the frame-shaped portion 51 and the outer surface of the frame-shaped portion 51 comes into pressing contact with the inner surface of the frame-shaped body portion 30.

The pressing protrusions 103 are protrusions protruding outwards further than outer surfaces (also referred to as outer edges) of portions of the pair of second extension portions 88 and 89 in the insertion portion insertion direction F2 (the portions on the distal end side and the other end side of the insertion portion 81). Referring together to FIG. 15, each pressing protrusion 103 includes a pressing surface 104 that extends in parallel in the insertion portion insertion direction F2 and a tapered surface 105 in which a protrusion amount gradually decreases from the distal end of the pressing surface 104 toward the insertion portion insertion direction F2.

Modification

In the holding member, all the portions (the holding portion, the frame-shaped body portion, the first engagement portions, the second engagement portions, and the like) are integrally formed with a known synthetic resin material. The shape, the structure, the layout, and the like of each portion of the holding member are not particularly limited.

The holding portion 21 in the embodiment can retain and hold two long members P. However, for example, the holding portion may have a structure capable of retaining and holding one long member or three or more long members. Further, the frame-shaped body portion 30 in the embodiment includes four first engagement portions 43 and the pair of second engagement portions 45, 45, but the number of engagement portions is not particularly limited.

In the anti-vibration member, all the portions (the frame-shaped portion, the contact portions, the extension pieces, the elastic pieces, the first and second protrusion ridges, the third and fourth engagement portions, and the like) are integrally formed with an elastic resin material with anti-vibration performance, such as rubber or an elastic elastomer. Further, the shape, the structure, the layout, and the like of each portion of the anti-vibration member are not particularly limited.

In the embodiment, the pair of extension pieces 60, 60 are included, but two or more pairs of extension pieces may be included. The extension pieces 60 in the embodiment is pressed by the pressing surfaces 101 which are parts of the insertion portion 81 of the fixing member 80 to be bent and deformed, but the extension pieces may have a structure that is bent and deformed by being pressed by a flange of the fixing member.

Figure 11:
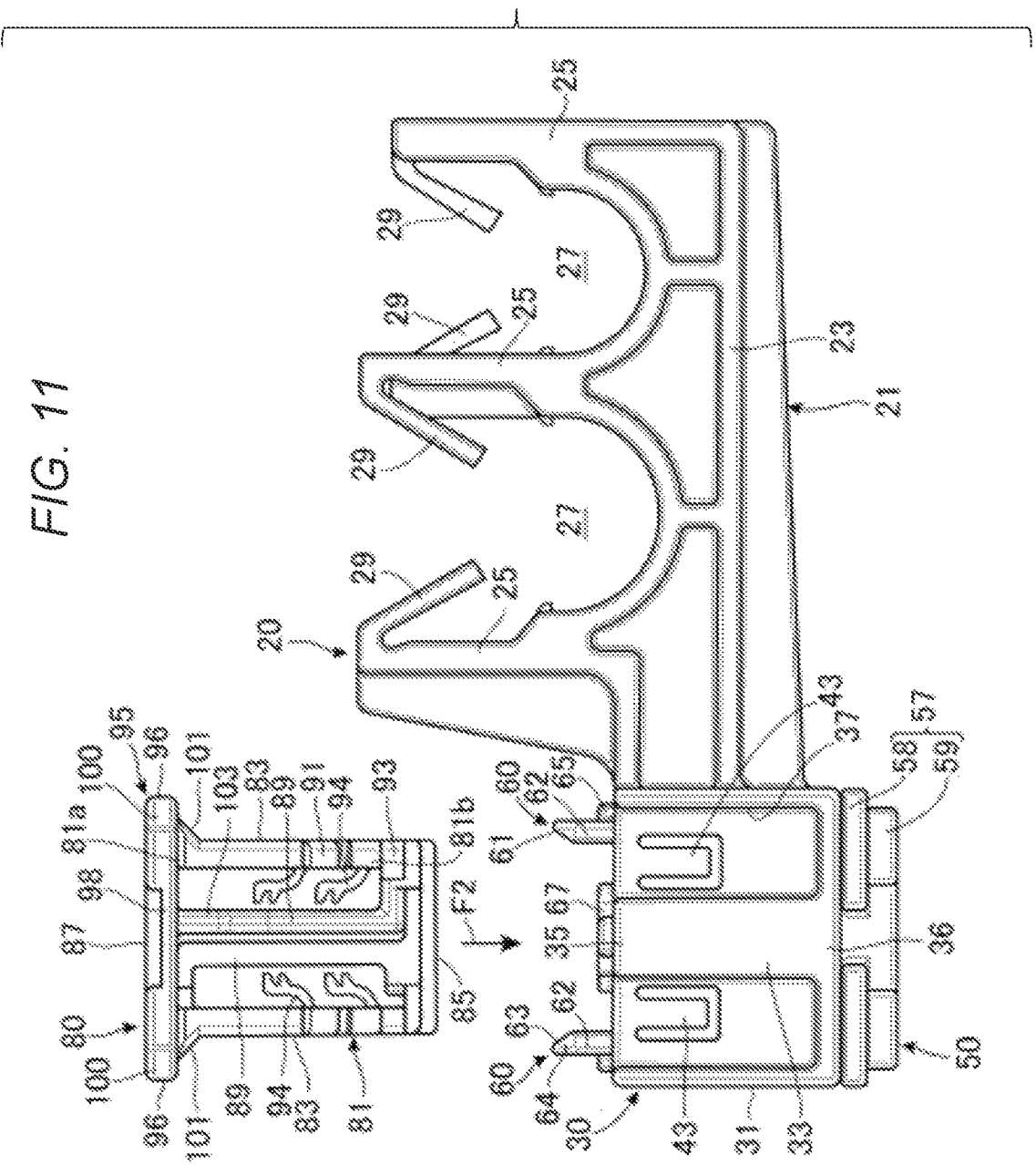
FIG. 11 is a diagram illustrating a second process in the assembly process.

Further, in the embodiment, before the frame-shaped portion 51 is inserted into the frame-shaped body portion 30 and before the insertion portion 81 is inserted into the frame-shaped portion 51, the pair of extension pieces 60, 60 extend straight to the walls 53 (see FIG. 11). In the state where the insertion portion 81 is inserted into the frame-shaped portion 51, the pair of extension pieces 60 are curved (see FIG. 12). Here, before the frame-shaped portion 51 is inserted into the frame-shaped body portion 30, the pair of extension pieces may be curved outwards in advance with respect to the walls 53, 53 (for example, curved at 90°) or the pair of extension pieces may be sandwiched between the frame-shaped body portion 30 and the flanges 95.

Further, in the embodiment, the pair of third engagement portions 69 and the four fourth engagement portions 75 are included, but the number of engagement portions is not particularly limited. Two first protrusion ridges 65 and two second protrusion ridges 71 extend on the outer surfaces of the walls 53 and 55, but the first and second protrusion ridges may be provided alone, or may be three or more.

Further, in the fixing member, all the portions (the insertion portion, the fifth and sixth engagement portions, the locking portions, the flanges, and the like) are integrally formed with a known synthetic resin material. Further, the shape, the structure, the layout, and the like of each portion of the fixing member are not particularly limited.

Further, in the embodiment, the outer circumferential shape of the flange 95 is a substantially rectangular shape. However, the outer circumferential shape of the flange may be, for example, a square shape, a triangular shape, a polygonal shape more than a pentagonal shape, a circular shape, an oval shape, an elliptical shape, a rugby ball shape, or the like or may have a width narrower than the width of the extension piece.

In the embodiment, as illustrated in FIG. 13, the clearances CL, CL are provided between the inner surfaces 33a, 33a of the pair of walls 33, 33 included in the frame-shaped body portion 30 and the outer edges 95a, 95a of the pair of second flanges 97 and 98 included in the flanges 95, but extension pieces or flanges may be provided using the clearances CL, CL.

For example, as a shape in which both sides of the extension piece in the width direction W are expanded toward the wall 33 side (see extension pieces 60': here, in a shape in which only one side is expanded for convenience), a configuration in which a substantially H shape is formed when the pair of extension pieces are viewed in the planar surface may be achieved. As a shape in which both sides in the width direction W, which are both ends of the flange in the extension direction F, are expanded toward the wall 33 side (see flanges 95': here, in a shape in which only one side is expanded for convenience), a configuration in which a substantially H shape is formed when the flanges are viewed in the planar surface may be achieved.

The fifth engagement portions 91 protrude from both side edges 84, 84 of the first extension portions 83 in the width direction. However, for example, the fifth engagement portions 91 may protrude from the outer surfaces of the first extension portions 83.

Further, in the embodiment, the pressing protrusions 103 are provided on the outer surfaces of the second extension portions 88 and 89. However, for example, the pressing protrusions may be provided on the outer surfaces of the first extension portions 83, 83.

Operation and Effect

Next, a method of using the holder 10 that has the foregoing configuration will be described.

First, the holder 10 including the holding member 20, the anti-vibration member 50, and the fixing member 80 is assembled.

That is, in a state where the third engagement portions 69 of the anti-vibration member 50 are positioned in a space between the pair of protrusions 39, 39 provided in the frame-shaped body portion 30, as indicated by the frame-shaped portion insertion direction F1 in FIG. 1 or 10, the frame-shaped portion 51 is inserted into the frame-shaped body portion 30 from the fixed member 1, that is, the one end 51a side of the frame-shaped portion 51 is inserted into the frame-shaped body portion 30 from the opening of the frame-shaped body portion 30 on the other end 36 side.

Then, the pair of first protrusion ridges 65, 65 come into sliding contact with the inner surfaces of the pair of walls 31, 31 of the frame-shaped body portion 30, the third engagement portions 69 are entered between the inner surface 39a, 39a of the pair of protrusions 39, 39 of the frame-shaped body portion 30, and the first engagement portions 43 are moved into the slits 66. Further, the outer surfaces of the third engagement portions 69 are pressed against the inner surfaces of the pair of walls 33, 33 of the frame-shaped body portion 30, and thus the pair of elastic pieces 67, 67 are inserted to be bent and deformed so that the distal ends are close to each other.

The frame-shaped portion 51 is pushed until the flange 58 of the contact portion 57 of the frame-shaped portion 51 comes into contact with the end surface of the frame-shaped body portion 30 on the other end 36 side. Then, the pair of extension pieces 60, 60 of the frame-shaped portion 51 protrude from the end surfaces of the frame-shaped body portion 30 on the one end 35 side (see FIG. 11).

In addition, the third engagement portions 69 climb over the second engagement portions 45 of the frame-shaped body portion 30, and the bent and deformed elastic pieces 67 are elastically returned. As illustrated in FIG. 15, the other end surface 69a of the third engagement portions 69 of the anti-vibration member 50 and the one end surface 45a of the second engagement portions 45 of the holding member 20 face each other at a predetermined clearance, the third engagement portions 69 and the second engagement portions 45 can engage with each other, and the anti-vibration member 50 can be assembled in the holding member 20.

Thereafter, in the state where the pair of fifth engagement portions 91, 91 of the insertion portion 81 of the fixing member 80 are positioned in the pair of slits 66, 66 of the frame-shaped portion 51 inserted into the frame-shaped body portion 30, as indicated by the insertion portion insertion direction F2 in FIG. 1 or 11, the insertion portion 81 is inserted into the frame-shaped portion 51 from the opposite side to the fixed member 1, that is, the other end 81b side of the insertion portion 81 is inserted into the frame-shaped portion 51 from the opening of the one end 51a side of the frame-shaped portion 51.

Then, the pair of fifth engagement portions 91, 91 of the insertion portion 81 are moved into the pair of slits 66, 66 of the frame-shaped portion 51, the fifth engagement portions 91 press the first engagement portions 43 of the frame-shaped body portion 30, and the first engagement portions 43 are bent and deformed outwardly of the frame-shaped body portion 30.

Further, when the insertion portion 81 is pushed into the frame-shaped portion 51, the inner surfaces (here, the tapered surfaces 63, 63) of the distal ends 61, 61 of the pair of extension pieces 60, 60 are pressed by the pair of pressing surfaces 101, 101 provided in parts of the insertion portion 81 so that the pair of extension pieces 60, 60 are bent and deformed to be curved outwards.

The pushing-in is performed until the outer surfaces of the distal ends 61, 61 of the pair of extension pieces 60, 60 come into contact with the end surfaces of the pair of walls 31, 31 included in the frame-shaped body portion 30 on the one end 35 side, and the pair of first flanges 96, 96 included in the flanges 95 come into contact with the inner surfaces of the distal ends 61, 61 of the pair of extension pieces 60, 60.

Then, the maximum insertion position of the insertion portion 81 to be inserted into the frame-shaped portion 51 is regulated, the fourth engagement portions 75 of the frame-shaped portion 51 are entered into the sixth engagement portions 93 of the insertion portion 81, and the sixth engagement portions 93 and the fourth engagement portions 75 engage with each other (see FIG. 16), so that the fixing member 80 can be assembled in the anti-vibration member 50.

In addition, each fifth engagement portion 91 climbs over each first engagement portion 43, and thus each first engagement portion 43 is elastically returned. As illustrated in FIG. 16, the first engagement portion 43 and the fifth engagement portion 91 face at a predetermined clearance, and thus the first engagement portion 43 and the fifth engagement portion 91 can engage with each other.

As illustrated in FIG. 14, the pair of pressing surfaces 101, 101 are in close contact with the inner surface of the pair of extension pieces 60, 60, the pair of first flanges 96, 96 are placed on the inner surfaces of the distal ends 61, 61 of the pair of extension pieces 60, 60, and the distal ends 61 of the extension pieces 60 are sandwiched between the end surfaces of the walls 31 on the one end 35 side and the first flanges 96.

Further, as illustrated in FIG. 15, each pressing protrusion 103 provided in the fixing member 80 comes into pressing contact with the inner surface of each elastic piece 67 provided in the holding member 20.

As illustrated in FIG. 15, both sides on the rear surface side of the second flange 97 in the width direction are placed on the distal end 61 of one extension piece 60. Further, both sides on the rear surface side of the second flange 98 in the width direction are placed on the distal end 61 of the other extension piece 60, and the intermediate portion on the rear surface side of the second flange 98 in the width direction are placed on the end of the predetermined wall 55 included in the frame-shaped portion 51 on the one end 51a side.

As illustrated in FIG. 15, the tapered surfaces 105 and the pressing surfaces 104 of the pair of pressing protrusions 103, 103 press the tapered surfaces 67a, 67a of the inner surfaces of the distal ends of the pair of elastic pieces 67, 67. As illustrated in FIG. 17, the outer surfaces of the pair of second protrusion ridges 71, 71 come into pressing contact with the inner surfaces of the protrusions 39, 39 of the pair of 33, 33 included in the frame-shaped body portion 30.

As described above, after the holder 10 is assembled, the holder 10 is fixed to the fixed member 1 via the shaft member 5. That is, the holder 10 is pushed toward the fixed member 1 in a direction close to the fixed surface 3.

Then, the shaft member 5 passes through an opening of the frame-shaped portion 51 on the other end 51b side from the other end side of the shaft member 5, is received inside the insertion portion 81, and is locked to the plurality of locking portions 94. Thereafter, by pushing the holder 10 until the pedestal 59 of the contact portion 57 of the frame-shaped portion 51 comes into contact with the fixed surface 3, the holder 10 can be fixed to the fixed member 1 via the shaft member 5.

Subsequently, by inserting the long member P into the holding space 27 of the holding portion 21, it is possible to hold the long member P by the holding claws 29 and arrange the long member P in the fixed member 1 via the holder 10 (see FIG. 12). The long member P may be held before the holder 10 is fixed to the fixed member 1.

In the holder 10, as illustrated in FIG. 14, the pair of extension pieces 60, 60 are sandwiched between the frame-shaped body portion 30 and the flanges 95. As illustrated in FIG. 13, the clearances CL are provided between the inner surfaces 33a, 33a of the walls 33, 33 forming frame-shaped body portion side walls in the present invention facing the walls 55, 55 in which the pair of extension pieces 60, 60 of the anti-vibration member 50 are not provided in the frame-shaped body portion 30 and the outer edges 95a, 95a of the flanges 95 facing the walls 33, 33.

Figure 18:
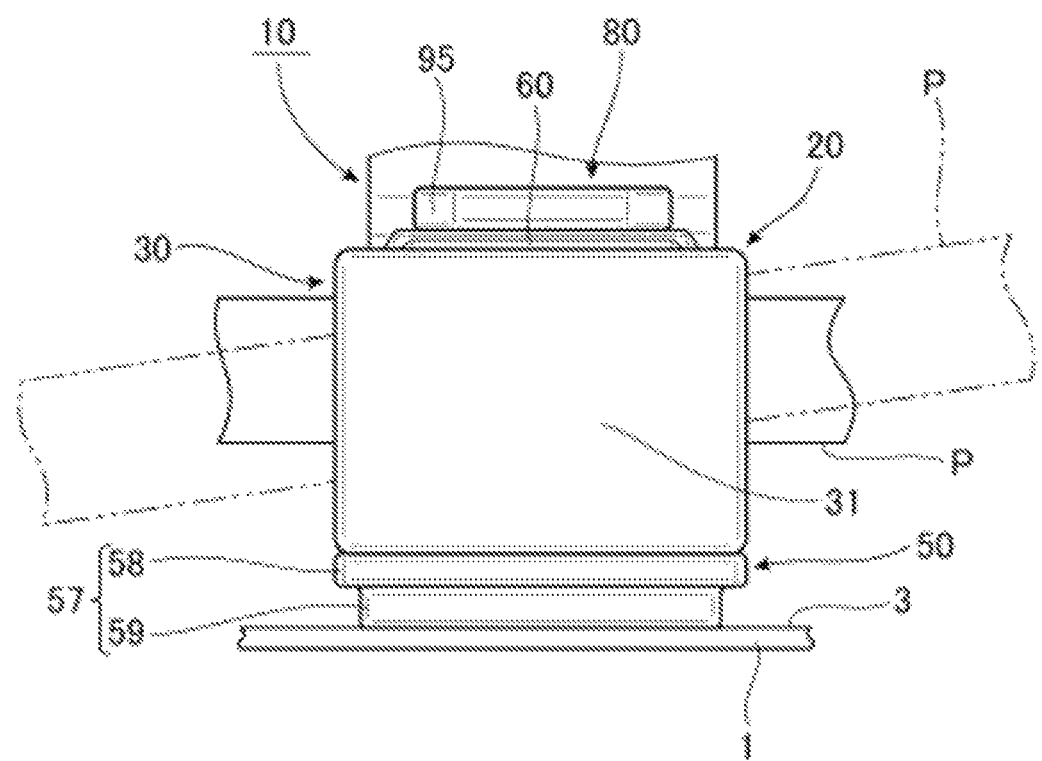
FIG. 18 is a diagram illustrating a case where a force that twists a long member is applied to the long member held in the holding portion of the holding member in the holder for the long member according to the present invention.

Therefore, even when a force that twists the long member P held in the holding portion 21 (hereinafter simply referred to as a "twisting force"), that is, for example, as indicated by a two-dot chain line in FIG. 18, a force that causes the long member P to approach or move away from the fixed surface 3 of the fixed member 1 is applied, the frame-shaped body portion 30 of the holding member 20 can be hindered from interfering with the flanges 95 of the fixing member 80.

That is, even when a twisting force is applied to the long member P and the frame-shaped body portion 30 is to come into contact with the flanges 95, the frame-shaped body portion 30 comes into contact with the extension pieces 60 of the anti-vibration member 50 at locations at which the pair of extension pieces 60, 60 are provided. Therefore, the frame-shaped body portion 30 is inhibited from coming into direct contact with the flanges 95.

At locations at which the pair of extension pieces 60, 60 are not provided, as described above, the clearances CL, CL are provided between the inner surfaces 33a, 33a of the walls 33, 33 of the frame-shaped body portion 30 and the outer edges 95a, 95a of the flanges 95. Therefore, even in this case, when a twisting force is applied to the long member P, the frame-shaped body portion 30 can be hindered from interfering with the flanges 95.

Accordingly, in the holder 10, at both the locations where the pair of extension pieces 60, 60 of the anti-vibration member 50 are provided and the locations where the pair of extension pieces 60, 60 are not provided, the frame-shaped body portion 30 can be hindered from interfering with the flanges 95. As a result, in the holder 10, a transmission path of vibration hardly occurs without involving the anti-vibration member 50 (it is possible to suppress the generation of a transmission path of vibration that occurs when the frame-shaped body portion 30 and the flanges 95 come into contact with each other). Therefore, anti-vibration performance of the anti-vibration member 50 can be sufficiently achieved.

In the embodiment, as illustrated in FIG. 13, the flanges 95 are formed with the width narrower than the inner dimension of the frame-shaped body portion 30 in the width direction of the extension pieces 60.

According to the foregoing aspect, since the flanges 95 are formed with the width narrower than the inner dimension of the frame-shaped body portion 30 in the width direction of the extension pieces 60, the frame-shaped body portion 30 can be further hindered from interfering with the flanges 95.

Further, in the embodiment, as illustrated in FIG. 13, the flanges 95 of the fixing member 80 are formed with a width narrower than the width of the extension piece 60 of the anti-vibration member 50.

According to the foregoing aspect, since the flanges 95 are formed with the width narrower than the width of the extension pieces 60 of the anti-vibration member 50, the frame-shaped body portion 30 can be further hindered from interfering with the flanges 95.

In the embodiment, the flanges 95 are shorter than the distal ends 61 of the extension pieces 60 in the state where the extension pieces 60 are curved outwards (see FIG. 13).

According to the foregoing aspect, the flanges 95 are shorter than the distal ends 61 of the extension pieces 60 in the state where the extension pieces 60 are curved outwards. Therefore, the frame-shaped body portion 30 can be further hindered from interfering with the flanges 95 of the fixing member 80.

Further, in the embodiment, both sides in the width direction W of the distal end 61 of each extension piece 60 are notched as extension piece-side tapered portions 64, 64 and the width of the distal end 61 is narrowed. When viewed in the insertion direction in which the insertion portion 81 is inserted into the frame-shaped portion 51 (the insertion portion insertion direction F2), the flange-side tapered portions 100, 100 are formed at the positions corresponding to the extension piece-side tapered portions 64, 64 in the flanges 95 (see FIG. 13).

According to the foregoing aspect, both sides in the width direction W of the distal ends 61 of the extension pieces 60 are notched as extension piece-side tapered portions 64, 64 and the width of the distal end 61 is narrowed. Therefore, when the frame-shaped portion 51 is inserted into the frame-shaped body portion 30, an insertion property can be improved.

When viewed in the insertion portion insertion direction F2, the flange-side tapered portions 100, 100 are formed at the positions corresponding to the extension piece-side tapered portions 64, 64 in the flanges 95. Therefore, when the flanges 95 press the extension pieces 60, the frame-shaped body portion 30 can be further hindered from interfering with the flanges 95 while ensuring a pressable area of the flanges 95 as much as possible.

Further, the flanges 95 can be reliably suppressed from protruding from the outer edges of the extension pieces 60. When the tapered portion is provided in only one of the extension piece 60 or the flange 95, there is a concern that the outer edge of the flange 95 protrudes from the outer edge of the extension piece 60.

In the embodiment, the frame-shaped portion 51 includes the walls 53 in which the extension pieces 60 are provided. On the outer surfaces of the walls 53, the protrusion ridges (here, the first protrusion ridges 65) extending by lengths which do not reach the distal ends 61 of the extension pieces 60 and coming into contact with the inner surface of the frame-shaped body portion 30 are formed.

According to the foregoing aspect, as illustrated in FIG. 14 or 17, the protrusion ridges (the first protrusion ridges 65) formed on the outer surface of the frame-shaped portion 51 come into contact with the inner surfaces of the frame-shaped body portion 30 of the holding member 20. Therefore, anti-vibration performance of the anti-vibration member 50 can be improved.

The protrusion ridges (the first protrusion ridges 65) extend by the lengths which do not reach the distal ends 61 of the extension pieces 60 on the outer surfaces of the walls 33. Therefore, after the frame-shaped portion 51 is inserted into the frame-shaped body portion 30, when the insertion portion 81 is inserted into the frame-shaped portion 51, and the extension pieces 60 are pressed by the flange 95 or a part the (pressing surfaces 101) of the insertion portion 81 and are curved outwards, the extension pieces 60 can be easily curved and deformed at predetermined positions without obstructing the curving of the extension pieces 60.

Further, in the embodiment, at the ends of the insertion portion 81 on the flange 95 side, the pressing surfaces 101 that have a tapered shape, press the inner surfaces of the distal ends 61 of the extension pieces 60, and curve the extension pieces 60 outwards are formed (see FIGS. 7 and 14).

According to the foregoing aspect, the pressing surfaces 101 that have a tapered shape, press the inner surfaces of the distal ends 61 of the extension pieces 60, and curve the extension pieces 60 outwards are formed at the ends of the insertion portion 81 on the flange 95 side. Therefore, after the frame-shaped portion 51 is inserted into the frame-shaped body portion 30, when the insertion portion 81 is inserted into the frame-shaped portion 51, the extension pieces 60 can be easily curved and deformed at the predetermined positions.

In the state where the insertion portion 81 is inserted into the frame-shaped portion 51, the extension pieces 60 are easily brought into close contact with the frame-shaped body portion 30 (as illustrated in FIG. 14, the outer surfaces of the distal ends 61 of the extension pieces 60 are easily brought into close contact with the end surfaces of the walls 31 of the frame-shaped body portion 30 on the one end 35 side), and thus the frame-shaped body portion 30 can be further hindered from interfering with the flanges 95. When there are gaps between the extension pieces 60 and the frame-shaped body portion 30, the extension pieces 60 are easily deformed after the anti-vibration member 50 and the fixing member 80 are assembled in the holding member 20, and thus the frame-shaped body portion 30 easily interferes with the flanges 95.

Further, in the embodiment, the insertion portion 81 includes the extension portions (the pair of second extension portions 88 and 89) extending in the insertion direction F2 in which the insertion portion 81 is inserted into the frame-shaped portion 51 (the insertion portion insertion direction F2), and the pressing protrusions 103, 103 protrude at least in the portions opposite to the insertion direction F2 on the outer surfaces of the pair of second extension portions 88 and 89. When the frame-shaped portion 51 is inserted into the frame-shaped body portion 30 and the insertion portion 81 is inserted into the frame-shaped portion 51, the pressing protrusions 103, 103 press the inner surfaces of the frame-shaped portion 51 and the outer surface (the outer surfaces of the second protrusion ridges 71) of the frame-shaped portion 51 comes into pressing contact with the inner surface of the frame-shaped body portion 30 (see FIGS. 15 and 17).

According to the foregoing aspect, when the frame-shaped portion 51 is inserted into the frame-shaped body portion 30 and the insertion portion 81 is inserted into the frame-shaped portion 51, the pressing protrusions 103, 103 provided in the second extension portions 88 and 89 press the inner surface of the frame-shaped portion 51 and the outer surface (the outer surfaces of the second protrusion ridges 71) of the frame-shaped portion 51 accordingly comes into pressing contact with the inner surface (the inner surfaces of the protrusions 39, 39 of the pair of walls 33, 33) of the frame-shaped body portion 30 (see FIGS. 15 and 17).

Therefore, even when a twisting force is applied to the long member P held in the holding portion 21, tilting, toppling, falling, or the like of the frame-shaped body portion 30 can be inhibited, and thus the frame-shaped body portion 30 of the holding member 20 can be hindered from interfering with the fixing member 80. As a result, in the holder 10, a transmission path of vibration hardly occurs without involving the anti-vibration member 50. Therefore, anti-vibration performance of the anti-vibration member 50 can be sufficiently achieved.

Even when the twisting force is applied to the long member P held in the holding portion 21 in the holder 10, anti-vibration performance of the anti-vibration member 50 can be more reliably achieved because of synergistic effects of the effect obtained by the structure in which the flanges 95 of the fixing member 80 have the widths narrower than the widths of the extension pieces 60 of the anti-vibration member 50 and the effect obtained by the structure described in Paragraph 0142.

The present invention is not limited to the foregoing embodiments, but may be modified in various modified embodiments within the scope of the gist of the present invention and these embodiments are also included in the scope of the present invention.

What is claimed is:

1. A holder for a long member that is configured to be fixed to a fixed member including a shaft member via the shaft member and that is configured to hold the long member, the holder for the long member comprising:
   a holding member that includes a frame-shaped body portion to which a holding portion for holding the long member is connected;
   an anti-vibration member that is made of an elastic material and includes a frame-shaped portion configured to be inserted into the frame-shaped body portion; and
   a fixing member that is provided with an insertion portion configured to be inserted into the frame-shaped portion and configured to receive the shaft member, a locking portion provided inside the insertion portion and configured to be locked to the shaft member, and a flange overhung on one end side of the insertion portion, wherein
   the anti-vibration member includes
      a pair of extension pieces that are disposed to face each other, that protrude from the frame-shaped body portion in a state where the frame-shaped portion is inserted into the frame-shaped body portion, and that are sandwiched between the frame-shaped body portion and the flange when the insertion portion is inserted into the frame-shaped portion, and a pair of walls that are disposed in a direction orthogonal to a facing direction of the pair of extension pieces and that are not sandwiched between the frame-shaped body portion and the flange when the insertion portion is inserted into the frame-shaped portion, and when viewed in an insertion direction of the insertion portion, clearance in a facing direction of the pair of walls is provided between an inner surface of a frame-shaped body portion side wall that faces one of the pair of walls in which the pair of extension pieces of the anti-vibration member are not provided in the frame-shaped body portion, and an outer edge of the flange facing the frame-shaped body portion side wall.

2. The holder for the long member according to claim 1, wherein the flange is formed with a width narrower than an inner dimension of the frame-shaped body portion in a width direction of the extension piece.

3. The holder for the long member according to claim 1, wherein the flange is formed with a width narrower than a width of the extension piece.

4. The holder for the long member according to claim 1, wherein the flange is shorter than a distal end of the extension piece in a state where the extension piece is curved outwards.

5. The holder for the long member according to claim 1, wherein the frame-shaped portion includes another pair of walls, each of which is provided with the extension piece, and a protrusion ridge that extends by a length which does not reach a distal end of the extension piece and that is configured to come into contact with an inner surface of the frame-shaped body portion is formed on an outer surface of one of the another pair of walls.

6. A holder for a long member that is configured to be fixed to a fixed member including a shaft member via the shaft member and that is configured to hold the long member, the holder for the long member comprising:

a holding member that includes a frame-shaped body portion to which a holding portion for holding the long member is connected;

an anti-vibration member that is made of an elastic material and includes a frame-shaped portion configured to be inserted into the frame-shaped body portion; and a fixing member that is provided with an insertion portion configured to be inserted into the frame-shaped portion and configured to receive the shaft member, a locking portion provided inside the insertion portion and configured to be locked to the shaft member, and a flange overhung on one end side of the insertion portion, wherein the anti-vibration member includes a pair of extension pieces that protrude from the frame-shaped body portion in a state where the frame-shaped portion is inserted into the frame-shaped body portion, and that are sandwiched between the frame-shaped body portion and the flange when the insertion portion is inserted into the frame-shaped portion, when viewed in an insertion direction of the insertion portion, clearance is provided between an inner surface of a frame-shaped body portion side wall that faces a first wall in which the pair of extension pieces of the anti-vibration member are not provided in the frame-shaped body portion, and an outer edge of the flange facing the frame-shaped body portion side wall, and a pressing surface that has a tapered shape, that is configured to press an inner surface of a distal end of the extension piece, and that is configured to curve the extension piece outwards, is formed at an end of the insertion portion on a side of the flange.

* * * * *